(12) United States Patent
Kiuchi

(10) Patent No.: US 8,711,397 B2
(45) Date of Patent: Apr. 29, 2014

(54) PRINTING SYSTEM, INFORMATION PROCESSING APPARATUS, PRINT JOB PROCESSING METHOD, INFORMATION PROCESSING METHOD, PROGRAM, AND STORAGE MEDIUM

(75) Inventor: Yohei Kiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1216 days.

(21) Appl. No.: 12/610,250

(22) Filed: Oct. 30, 2009

(65) Prior Publication Data

US 2010/0118337 A1 May 13, 2010

(30) Foreign Application Priority Data

Nov. 10, 2008 (JP) ................. 2008-287946

(51) Int. Cl.
*G06F 3/12* (2006.01)
(52) U.S. Cl.
USPC ........ 358/1.15; 358/1.14; 358/1.13; 358/1.16
(58) Field of Classification Search
USPC ............................................ 399/81, 1; 710/1
See application file for complete search history.

(56) References Cited

U.S. PATENT DOCUMENTS

| 6,246,485 | B1 * | 6/2001 | Brown et al. ................ 358/1.13 |
| 6,940,615 | B1 * | 9/2005 | Shima .......................... 358/1.15 |
| 7,489,415 | B2 * | 2/2009 | Furuta et al. ................ 358/1.15 |
| 2008/0079993 | A1 | 4/2008 | Kanamoto |
| 2008/0174818 | A1 | 7/2008 | Kanamoto |

FOREIGN PATENT DOCUMENTS

EP 1986410 A1 10/2008
JP 2008-090631 A 4/2008

OTHER PUBLICATIONS

European Search Report dated Oct. 8, 2012 issued in corresponding European Patent Application No. 09175356.6.

* cited by examiner

*Primary Examiner* — Ashish K Thomas
(74) *Attorney, Agent, or Firm* — Fitzpatrick, Cella, Harper & Scinto

(57) ABSTRACT

Device capability information associated with a print job is specified, and it is determined whether the specified device capability information is valid in a printing system. If it is determined that the specified device capability information is valid, print processing is done. If it is determined that the specified device capability information is invalid, it is further determined whether the printing system can execute the print job. Then, execution of the print processing is controlled.

27 Claims, 28 Drawing Sheets

FIG. 6

| | |
|---|---|
| BOOT LOADER | ~3101 |
| OPERATING SYSTEM | ~3102 |
| DATA TRANSMISSION / RECEPTION PROGRAM | ~3103 |
| DEVICE MANAGEMENT FUNCTION PROGRAM | ~3104 |
| COPY FUNCTION PROGRAM | ~3105 |
| SCAN FUNCTION PROGRAM | ~3106 |
| PDL PRINT FUNCTION PROGRAM | ~3107 |
| JDF PRINT FUNCTION PROGRAM | ~3108 |
| BOX FUNCTION PROGRAM | ~3109 |
| UI CONTROL PROGRAM | ~3110 |
| ANOTHER CONTROL PROGRAM | ~3111 |
| MOUNTED OPTION CAPABILITY TABLE | ~3112 |

FIG. 9A

```
<?xml version = "1.0" encoding = "UTF-8"?>
<JDF xmlns = "http://www.CIP4.org/JDFSchma_1_1" xmlnsxsi = "http://www.w3org/2oo1/XMLSchma-instance"
xmlns:cj = "http://www.canon.com/ns/CanonJDF" Job1D = "func-033" JobPert1D = "1112" Category = "DigitalPrinting"
ID = "ICSIDF_Exemple 1_Root" Status = "Ready" MaxVersion = "1.2" Version = "1.2" ICSVersions = "Base_L0-1.0 IDP L1-1.0"
Activation = "Active" DescriptiveName = "Document Test00001" Type = "combined" refDevCapID = "CAP508261"
Types = "LayoutPreparation Imposition Interpreting Rendering DigitalPrinting Stitching>                           } 3701
<AuditPool>
  <Created AgentName = "softname1" AgentVersion = "1.11" TimeStamp = "2004-12-23T10:16:00Z"/>
  <Modified AgentName = "softname2" AgentVersion = "2.22" TimeStamp = "2005-02-05T03:01:59+03:00"/>
</AuditPool>                                                                                                     } 3702
<ResourceLinkPool>
  <RunListLink rRef = "LinkRunList" Usage = "Input" CombinedProcessIndex = "0.1"/>
  <LayoutPreparationParamsLink rRef = "LinkLayoutPreparationParams" Usage = "Input" CombinedProcessIndex = "0"/>
  <InterpretingParamsLink rRef = "LinkInterpretingParams" Usage = "Input" CombinedProcessIndex = "2"/>
  <RenderingParamsLink rRef = "LinkRendaringParams" Usage = "Input" CombinedProcessIndex = "3"/>
  <DigitalPrintingParamsLink rRef = "LinkDigitalPrintingParams" Usage = "Input" CombinedProcessIndex = "4"/>
  <StitchingParamsLink rRef = "LinkStitchingParams" Usage = "Input" CombinedProcessIndex = "5"/>
  <ComoonentLink rRef = "LinkComponent" Usage = "Output" CombinedProcessIndex = "5"/>
</ResourceLinkPool>                                                                                              } 3703
```

FIG. 9B

```xml
<ResourcePool>
  <LayoutElement Class = "Parameter" ID = "LinkLayoutElement" Status = "Available">
    <FileSpec Compression = "None" URL = "cid:0000" MimeType = "application/postscript"/>
  </LayoutElement>
  <RunList Class = "Parameter" ID = "LinkRunList" Status = "Available">
    <LayoutElementRef rRef = "LinkLayoutElement"/>
  </RunList>
  <LayoutPreparationParams Class = "Parameter" ID = "LinkLayoutPreparationParams" Status = "Available" NumberUp = "2 1"
    PageDistributionScheme = "Saddle" Side = "TwoSidedFlip Y" cj:PageSetType = "Left" SurfaceContentsBox = "2 4.4 800 500.5"/>
  <InterpretingParams Class = "Parameter" ID = "LinkInterpretingParams" Status = "Available" PrintQuality = "High"/>
  <RenderingParams Class = "Parameter" ID = "LinkRenderingParams" Status = "Available"/>
  <Media Class = "Consumable" ID = "LinkMedia2" Status = "Available" Dimention = "842 1191"/>
  <DigitalPrintingParams Class = "Parameter" ID = "LinkDigitalPrintingParams" Status = "Available" PartIDKeys = "RunIndex">
    <MediaRef rRef = "LinkMedia2"/>
  </DigitalPrintingParams>
  <StitchingParams Class = "Parameter" ID = "LinkStitchingParams" Status = "Available" StitchType = "Saddle"/>
  <Component Class = "Quantity" ID = "LinkComponent" ComponentType = "FinalProduct" Status = "Unavailable"/>
</ResourcePool>
</JDF>
```

```
<?xml version = "1.0" encoding = "UTF-8"?>
<JMF SenderID = "ClientPC" Version = "1.3" xmlns = "http://www.CIP4.org/JDFSchema_1_1"
xmlns:xsi = "http://www.w3.org/2001/XMLSchema-instance"/>
    <QueryID = "m000011" Type = "KnownDevices" xsi.type = "QueryKnownDevices"/>
</JMF>
```

```
<?xml version = "1.0" encoding = "UTF-8"?>
<JMF SenderID = "Message Sender" Version = "1.3" xmlns = "http://www.CIP4.org/JDFSchema_1_1"
xmlns:xsi = "http://www.w3.org/2001/XMLSchema-instance">
  <Response ID = "Response0001" Type = "KnownDevices" xsi.type = "ResponseKnownDevices">
    <DeviceList>
      <DeviceInfo DeviceStatus = "Idle">
        <Device Class = "Implementation" DeviceID = "Device0001" DeviceType = "DeviceType0001">
          <DeviceCap DevCapID = "CAP508261">
```
} 3721

FIG. 11B

```
<DevCapPool>
    <DevCap Name = "RunList" ID = "IDRunList">
        <EnumerationState Name = "Status" AllowedValueList = "Available" HasDefault = "false"/>
        <DevCap Name = "LayoutElement">
            <DevCap Name = "FileSpac">
                <StringState Name = "MimeType" AllowedValueList = "application/postscript"/>
            </DevCap>
        </DevCap>
    </DevCap>
    <DevCap Name = "LayoutPreparationParams" ID = IDLayoutPreparationParams">
        <EnumerationState Name = "Statue" AllowedValueList = "Available" HasDefault = "false"/>
        <EnumerationState Name = "Sides" HasDefault = "true" AllowedValueList = "OneSidedFront TwoSidedFlipX
TwoSideFlipY" DefaultValue = "OneSidedFront" MinOccurs = "0" MaxOccurs = "1"/>
    </DevCap>
    <DevCap Name = "InterpretingParams" ID = "IDInterpretingParams">
        <EnumerationState Name = "Status" AllowedValueList = "Available" HasDefault = "false"/>
    </DevCap>
    <DevCap Name = "ColorantControl" ID = "IDColorantControl">
        <EnumerationState Name = "Status" AllowedValueList = "Available" HasDefault = "false"/>
        <EnumerationState Name = "ProcessColorModel" HasDefault = "true" AllowedValueList = "DeviceCMYK DeviceGray"
DefaultValue = "DeviceCMYK" MinOccurs = "0" MaxOccurs = "1"/>
    </DevCap>
    <DevCap Name = "RenderingParams" ID = "IDRenderingParams">
        <EnumerationState Name = "Statue" AllowedValueList = "Available" HasDefault = "false"/>
    </DevCap>
    <DevCap Name = "DigitalPrintingParams" ID = "IDDigitalPrintingParams" DevCapRefs = "DEVCAP_000">
        <EnumerationState Name = "Statue" AllowedValueList = "Available" HasDefault = "false"/>
    </DevCap>
    <DevCap Name = "Media" ID = "IDMedia">
        <EnumerationState Name = "Statue" AllowedValueList = "Available" HasDefault = "false"/>
        <XYPairState Name = "Dimension" HasDefault = "false" UnitType = "Length">
            <Value AllowedValue = "842 595"/>
            <Value AllowedValue = "842 1191"/>
            <Value AllowedValue = "729 516"/>
            <Value AllowedValue = "729 1032"/>
            <Value AllowedValue = "729 612"/>
        </XYPairState>
    </DevCap>
    <DevCap Name = "Component" ID = "IDFinalComponent">
        <EnumerationState Name = "Status" AllowedValueList = "Unavailable" HasDefault = "false"/>
        <EnumerationState Name = "ComponentType" AllowedValueList = "FirstProduct" ListType = "List" HasDefault = "false"/>
    </DevCap>
</DevCapPool>
        </DeviceCap>
    </Device>
  </DeviceInfo>
 </DeviceList>
</Response>
</JMF>
```

3722

F I G. 12

| | DEVICE TYPE | CATEGORY | FUNCTION | SUPPORT STATUS |
|---|---|---|---|---|
| 3905 | MULTIFUNCTION PERIPHERAL MAIN BODY | PRINTING APPARATUS | DOUBLE-SIDED PRINTING | OK |
| | | | PAGE PRINTING | OK |
| | | | MIXED PAPER SIZES | OK |
| 3906 | LARGE-VOLUME PAPER DECK | DECK | PLAIN PAPER FEED | OK |
| | | | THICK PAPER FEED | OK |
| | | | TAB PAPER | OK |
| 3907 | LARGE-VOLUME STACKER | STACKER | SHIFT STACKING | OK |
| | | | ROTATION STACKING | UNSUPPORTED |
| | | | SHIFT STACKING AT DESIGNATED COPY COUNT | OK |
| 3908 | GLUE BINDING APPARATUS | FINISHER | CASE BINDING | OK |
| | | | SADDLE STITCHING | UNSUPPORTED |
| | | | ONE-SIDE CUTTING | OK |
| | | | THREE-SIDE CUTTING | OK |
| | | | SADDLE STITCHING | UNSUPPORTED |
| | | | PUNCHING | UNSUPPORTED |
| | | | CENTER FOLDING | UNSUPPORTED |
| 3909 | SADDLE STITCHING APPARATUS | FINISHER | CASE BINDING | UNSUPPORTED |
| | | | SADDLE STITCHING | OK |
| | | | ONE-SIDE CUTTING | OK |
| | | | THREE-SIDE CUTTING | UNSUPPORTED |
| | | | CENTER FOLDING | OK |
| | | | SADDLE STITCHING | OK |
| | | | PUNCHING | OK |

Column headers: 3901, 3902, 3903, 3904

FIG. 13

| | 4101 | 4102 | 4103 |
|---|---|---|---|

| DEVICE NAME | DEVICE TYPE | CONNECTION STATE |
|---|---|---|
| MULTIFUNCTION PERIPHERAL MAIN BODY | MULTIFUNCTION PERIPHERAL MAIN BODY | OK |
| LARGE-VOLUME PAPER DECK 1 | DECK | NOT CONNECTED |
| LARGE-VOLUME PAPER DECK 2 | DECK | NOT CONNECTED |
| PAPER DECK | DECK | NOT CONNECTED |
| SCANNER | MULTIFUNCTION PERIPHERAL MAIN BODY | OK |
| LARGE-VOLUME STACKER 1 | STACKER | OK |
| LARGE-VOLUME STACKER 2 | STACKER | NOT CONNECTED |
| LARGE-VOLUME STACKER 3 | STACKER | NOT CONNECTED |
| GLUE BINDING APPARATUS 1 | FINISHER | NOT CONNECTED |
| GLUE BINDING APPARATUS 2 | FINISHER | NOT CONNECTED |
| SADDLE STITCHING APPARATUS | FINISHER | NOT CONNECTED |

FIG. 14

| FUNCTION (4301) | OPERATION SPECIFICATION IN CASE OF NOT SUPPORTING DESIGNATED FUNCTION (4302) | DEFAULT VALUE (4303) |
|---|---|---|
| DOUBLE-SIDED PRINTING | OPERATE AT DEFAULT VALUE | SINGLE-SIDED PRINTING |
| PAGE PRINTING | IGNORE | |
| MIXED PAPER SIZES | CANCEL JOB | |
| PLAIN PAPER FEED | CANCEL JOB | |
| THICK PAPER FEED | CANCEL JOB | |
| TAB PAPER | CANCEL JOB | |
| SHIFT STACKING | IGNORE | |
| ROTATION STACKING | OPERATE AT DEFAULT VALUE | NO SORTING |
| SHIFT STACKING AT DESIGNATED COPY COUNT | IGNORE | |
| CASE BINDING | CANCEL JOB | |
| SADDLE STITCHING | CANCEL JOB | |
| ONE-SIDE CUTTING | CANCEL JOB | |
| THREE-SIDE CUTTING | CANCEL JOB | |
| CENTER FOLDING | CANCEL JOB | |
| SADDLE STITCHING | IGNORE | |
| PUNCHING | IGNORE | |

FIG. 15

| FUNCTION | OPERATION SPECIFICATION IN CASE OF NOT SUPPORTING DESIGNATED FUNCTION | DEFAULT VALUE |
|---|---|---|
| DOUBLE-SIDED PRINTING | CANCEL JOB | |
| PAGE PRINTING | CANCEL JOB | |
| MIXED PAPER SIZES | CANCEL JOB | |
| PLAIN PAPER FEED | CANCEL JOB | |
| THICK PAPER FEED | CANCEL JOB | |
| TAB PAPER | CANCEL JOB | |
| SHIFT STACKING | CANCEL JOB | |
| ROTATION STACKING | CANCEL JOB | |
| SHIFT STACKING AT DESIGNATED COPY COUNT | CANCEL JOB | |
| CASE BINDING | CANCEL JOB | |
| SADDLE STITCHING | CANCEL JOB | |
| ONE-SIDE CUTTING | CANCEL JOB | |
| THREE-SIDE CUTTING | CANCEL JOB | |
| CENTER FOLDING | CANCEL JOB | |
| SADDLE STITCHING | CANCEL JOB | |
| PUNCHING | CANCEL JOB | |

FIG. 16

| 4501 | 4502 | 4503 |
|---|---|---|
| FUNCTION | ANALYSIS RESULT | EXECUTION POSSIBLE / IMPOSSIBLE |
| DOUBLE-SIDED PRINTING | DOUBLE-SIDED | OK |
| PAGE PRINTING | OFF | N / A |
| MIXED PAPER SIZES | OFF | N / A |
| PLAIN PAPER FEED | ON | OK |
| THICK PAPER FEED | OFF | N / A |
| TAB PAPER | OFF | N / A |
| SHIFT STACKING | OFF | N / A |
| ROTATION STACKING | OFF | N / A |
| SHIFT STACKING AT DESIGNATED COPY COUNT | OFF | N / A |
| CASE BINDING | OFF | N / A |
| SADDLE STITCHING | ON | UNSUPPORTED |
| ONE-SIDE CUTTING | OFF | N / A |
| THREE-SIDE CUTTING | OFF | N / A |
| CENTER FOLDING | ON | UNSUPPORTED |
| SADDLE STITCHING | ON | UNSUPPORTED |
| PUNCHING | OFF | N / A |

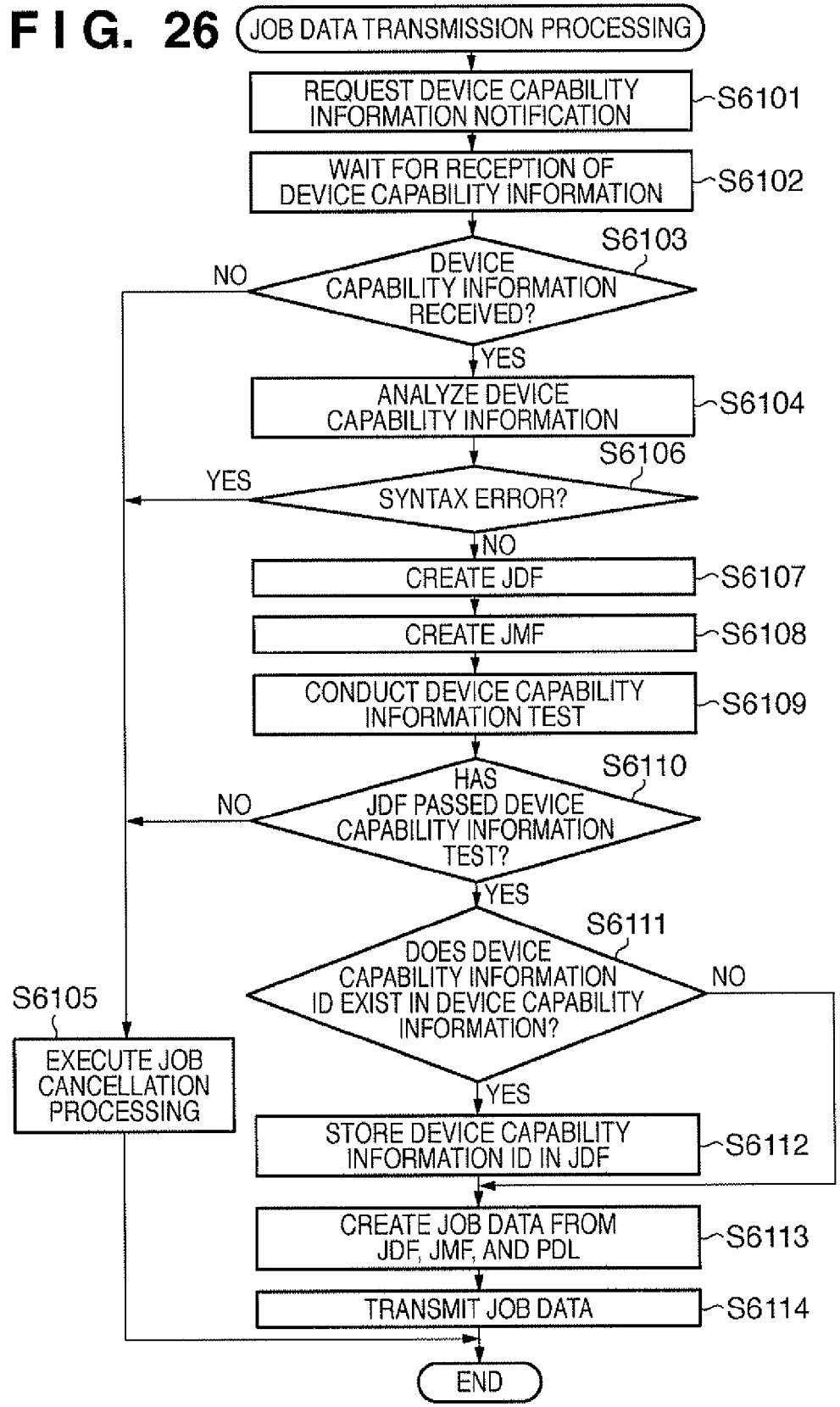

PRINTING SYSTEM, INFORMATION PROCESSING APPARATUS, PRINT JOB PROCESSING METHOD, INFORMATION PROCESSING METHOD, PROGRAM, AND STORAGE MEDIUM

BACKGROUND OF THE INVENTION

1. Field of the Invention

The present invention relates to a printing system, information processing apparatus, print job processing method, information processing method, program, and storage medium.

2. Description of the Related Art

In the commercial printing industry, a publication passes through various kinds of work steps during its production, publication and distribution including entry of a document, design of the document, layout editing, comprehensive layout, proofreading, proof, block copy preparation, printing, post-processing, and shipping. "Comprehensive layout" may be understood to mean the presentation of the document by printing, "proofreading" is understood to mean layout correction and color correction of the document, and "proof" is understood to mean proof-print, or the printing of a trial impression before the final publication is printed.

In the commercial printing industry, an offset reproduction printing press is often used in the printing process, so block copy preparation is indispensable. However, once the block copy is prepared, it is difficult to correct the block copy, and correcting the block copy raises costs. Hence, block copy preparation requires careful proofreading (i.e. careful layout check and color confirmation). It generally takes a significant amount of time to prepare and issue publications.

In the commercial printing industry, most apparatuses used in the respective work steps are bulky and expensive. Additionally, work in each step requires expert knowledge and, therefore, know-how of experts called craftsmen.

Under these circumstances, a so-called POD (Print-On-Demand) market is recently appearing along with the advent of high-speed and high-quality electrophotographic and inkjet printing apparatuses, and is competing with the commercial printing industry.

The POD market, which is replacing large-scale printing presses and printing methods, handles jobs of relatively small lots in a short delivery period without using any bulky apparatus or system.

The POD market implements digital printing using electronic data, and provides print services and the like by making the best of printing apparatuses such as a digital copying machine and a digital multifunction peripheral.

In the POD market, digitization has progressed, and management and control using computers have penetrated as compared to the conventional commercial printing industry. The use of computers enables issuing of printed materials in a short delivery term, and obviates the need for expert know-how. These days, the quality of printed materials is coming close to that of the commercial printing industry.

In these situations, office-equipment makers and the like are currently considering entering the new field of the POD market (e.g., see Japanese Patent Laid-Open No. 2008-090631). In particular, they are examining printing apparatuses and printing systems capable of fully satisfying requirements not only in an office environment but also in a POD environment that expects uses and needs different from those in the office environment. For a printing environment assumed in the POD market, how to improve the productivity of a printing system as well as how to design a user-friendly printing system for an operator while maintaining high productivity are expected to be important questions.

In recent years, JDF-compatible printing apparatuses have prevailed in the POD market. The JDF is a promising digital format (also called an "instruction statement" or "job ticket") common to all printing processes in the POD printing system that is defined by CIP4. JDF stands for Job Definition Format, and CIP4 stands for Cooperation for the Integration of Processes in Prepress, Press and Postpress. The JDF format uses the basic format "XML". The JDF is expected to facilitate management throughout all printing processes. For example, production control, and confirmation of the operating states of devices including a printing apparatus and bookbinding apparatus can be done on a website by using the feature of the JDF.

The JDF instruction statement can describe not only instructions to a single device, but also instructions associated with a series of work processes achieved by cooperation between devices, including document entry to delivery of printed materials serving as a final product. A single JDF instruction statement can also manage a workflow of processes using a plurality of devices. The JDF instruction statement enables cooperation between devices engaged in all printing processes and automation of various devices.

In this situation, JDF-compatible printing apparatuses have been developed for printing systems aimed at the POD market in order to make full use of JDF advantages.

As described above, for example, it is desirable for office-equipment makers to study the POD market situation and cope with use cases and user needs which do not occur in the office environment when fully entering the new POD market from the office environment which is their home market at present. In other words, in full-scale entry to the POD market, they must deliberately examine practical application of digital printing systems suited to the POD environment. However, a variety of user needs are predicted as follows when commercializing printing systems suitable for even the POD environment.

For example, a JDF-compatible digital multifunction peripheral needs to enable print settings designated by a job ticket. The job ticket is a device-independent common format which exploits the advantages of the JDF aiming at processing a job by various kinds of devices. Unlike a printer driver, the job ticket can be created without knowing any device specification or configuration information.

If a printing apparatus and system are actually configured considering this, new problems and users' needs that are to be tackled arise. For example, a printing apparatus (printing system) may not be able to completely execute operations designated by a job ticket depending on the execution environment (e.g., device capability or mounted accessories). For example, when a user designates printing using a job ticket but the printing apparatus (printing system) cannot create the designated printed materials (e.g. it is a black-and-white printer, but the job ticket is for a color print), he may want to cancel processing of the job. In a printing environment in the POD market, printed materials created by a printing system are highly likely to be handled as products to be delivered to customers. In this POD printing environment, printed materials which cannot be delivered to customers may be treated as wasted output. In a printing environment, like the POD environment, it is important for cost reduction to avoid a failure cost as much as possible if the printing system cannot create printed materials as designated. Such a demand will arise when a user (operator) in the POD environment wants to reduce the cost of defective outputs, so the printing system desirably meets this demand.

To cope with this, the JDF defines a specification to allow notification of device capability information of a printing apparatus. The device capability information creates notifications about JDF specifications processible by a printing apparatus, and enables cooperation between even mutually unknown printing apparatuses or systems. With the device capability information, a client can automatically generate a job ticket processible by a printing apparatus. Also, a device capability information test can be conducted to determine whether the printing apparatus can process the generated job ticket. The printing apparatus itself can use device capability information generated by it to determine whether it can process a received job ticket. These functions are indispensable for a JDF-compatible device to cooperate with unspecified JDF-compatible devices.

However, JDF specifications processed by devices are very complicated. The device capability information test executed for a job ticket by a printing apparatus is time-consuming, generating a printing standby time. When a normal print job is used, a printing apparatus is often shared between a plurality of client PCs connected via a network. When a plurality of client PCs input a plurality of print jobs to the apparatus, a plurality of jobs are queued in it. In such a case in which a printer is shared, a shorter printing standby time leads to a higher use efficiency of the device. This is an important factor for improving user-friendliness.

A printing system using the JDF requires device capability information because a job ticket may be created while device specifications and configuration information are not clear. In other words, a printing apparatus need not conduct the device capability information test as long as it is guaranteed that a client creates a job ticket with full knowledge about the arrangement of the printing apparatus and the specifications and status of device capability information.

From this, a printing apparatus notifies a specific client of processible JDF specifications in advance. The client generates JDF data processible by the printing apparatus, thereby shortening the printing time. In this case, the printing apparatus can start processing without performing the device capability information test for a job ticket transmitted from the specific client. The job ticket can therefore be processed quickly.

However, this configuration suffers the following problems. JDF specifications processible by a printing apparatus are not always constant. The printing apparatus may not completely execute operations designated by even a job ticket transmitted from a specific client. JDF specifications processible by a printing apparatus change depending on a change of the device configuration, a change of medium information, a change of the remaining amount of consumables, a change of the device status, and the like. Upon the change, the printing apparatus notifies the client of device capability information. However, no method is proposed to determine whether the device can process a received job ticket.

SUMMARY OF THE INVENTION

It is desired to overcome the conventional drawbacks, and provides a technique capable of executing appropriate print processing without bothering the user in a printing system which operates based on a print job describing printing conditions in a general-purpose format. It is particularly desired to provide a technique capable of improving user-friendliness of a device in a situation in which a printing apparatus cannot completely execute operations designated by a job ticket.

The present invention in its first aspect provides a printing system including a printing apparatus configured to perform print processing based on a print job, the system comprising:

a reception unit adapted to receive input of the print job;

a specifying unit adapted to specify device capability information which is associated with the print job and which represents a function processible by the printing system by analyzing the print job received by the reception unit;

a first determination unit adapted to determine whether the device capability information specified by the specifying unit is valid in the printing system; and a control unit adapted to control execution of the print job in accordance with a determination result of the first determination unit.

The present invention in its second aspect provides an information processing apparatus capable of communicating with a printing system, the apparatus comprising:

a requesting unit adapted to request the printing system to notify device capability information representing a function processible by the printing system;

a reception unit adapted to receive the device capability information transmitted from the printing system in response to a request from the requesting unit;

a generation unit adapted to generate a print job;

a determination unit adapted to determine, based on the device capability information, whether the printing system can process the print job;

a creation unit adapted to, when the determination unit determines that the printing system can process the print job, create print job data by adding, to the print job, identification information contained in the device capability information to specify the device capability information; and a transmission unit adapted to transmit the print job data created by the creation unit to the printing system.

The present invention in its third aspect provides a print job processing method in a printing system including a printing apparatus which performs print processing based on a print job, the method comprising:

an accepting step of accepting input of the print job;

a specifying step of specifying device capability information which is associated with the print job and represents a function processible by the printing system, by analyzing the print job accepted in the accepting step;

a first determination step of determining whether the device capability information specified in the specifying step is valid in the printing system; and a control step of controlling execution of the print job in accordance with a determination result of the first determination step.

The present invention in its fourth aspect provides an information processing method in an information processing apparatus capable of communicating with a printing system, the method comprising:

a requesting step of requesting the printing system to notify device capability information representing a function processible by the printing system;

a reception step of receiving the device capability information transmitted from the printing system in response to a request in the requesting step;

a generation step of generating a print job;

a determination step of determining, based on the device capability information, whether the printing system can process the print job;

a creation step of, when the printing system is determined in the determination step to be able to process the print job, creating print job data by adding, to the print job, identification information contained in the device capability information to specify the device capability information; and a transmission step of transmitting the print job data created in the creation step to the printing system.

One advantage of an aspect of the present invention is that it is capable of performing proper print processing without bothering the user in a printing system which operates based on a print job describing printing conditions in a general-purpose format.

Another aspect of the present invention has an advantage of contributing to the practical use of a product capable of meeting user needs concerning the JDF which may arise in a printing environment, like the POD environment, when a printing apparatus or system is configured to cope with the JDF.

Still another aspect of the present invention has an advantage of determining whether a printing apparatus can process a job ticket sent to a device upon a change of JDF specifications processible by the printing apparatus. The printing apparatus can quickly process a job ticket assured to be processible by it, without conducting the device capability information test. This can improve user-friendliness of the device.

Further features of the present invention will become apparent from the following description of exemplary embodiments (with reference to the attached drawings).

BRIEF DESCRIPTION OF THE DRAWINGS

FIG. 6 is a view for explaining various data stored in a ROM 207 included in the configuration of the printing system 1000 to be controlled in the embodiment;

FIGS. 9A and 9B are views for explaining an example of the JDF part of the JDF print job shown in FIG. 8 processible by the printing system 1000 to be controlled in the embodiment;

FIG. 10 is a view for explaining an example of a device capability information notification request processible by the printing system 1000 to be controlled in the embodiment;

FIGS. 11A and 11B are views for explaining an example of device capability information processible by the printing system 1000 to be controlled in the embodiment;

FIG. 12 is a table for explaining the internal structure of a mounted option capability table shown in FIG. 6 among various data stored in the ROM 207 included in the configuration of the printing system 1000 to be controlled in the embodiment;

FIG. 13 is a table for explaining the structure of a device configuration management table stored in a RAM 208 included in the configuration of the printing system 1000 to be controlled in the embodiment;

FIG. 14 is a first table for explaining the internal structure of a processing rule table 3302 shown in FIG. 7 among various data stored in a hard disk 209 (HDD) included in the configuration of the printing system 1000 to be controlled in the embodiment;

FIG. 15 is a second table for explaining the internal structure of the processing rule table 3302 shown in FIG. 7 among various data stored in the hard disk 209 (HDD) included in the configuration of the printing system 1000 to be controlled in the embodiment;

FIG. 16 is a table for explaining the structure of a JDF analysis result table stored in the RAM 208 included in the configuration of the printing system 1000 to be controlled in the embodiment;

FIG. 26 is a flowchart for explaining a job data transmission operation controlled by a printer control program 2502 of the client computer 104 in the third embodiment.

DESCRIPTION OF THE EMBODIMENTS

Illustrative embodiments of the present invention will be described in detail below with reference to the accompanying drawings. Building components set forth in these embodiments are merely examples. The technical scope of the present invention should be determined by the appended claims and is not limited to the individual embodiments to be described below.

<<First Embodiment>>

The first embodiment can provide a technique of continuing processing after conducting a device capability information test when it cannot be confirmed whether a printing apparatus can process a JDF, upon a change of JDF specifications processible by the printing apparatus. Even for a JDF created while device specifications and configuration information are unknown, processing can continue after performing the device capability information test. This can improve user-friendliness of the device.

[Description of System Configuration of Whole Printing Environment Including Printing System]

The present embodiment assumes a printing environment such as the POD environment different from the office environment in order to solve the problems described in Description of the Related Art above. The embodiment will describe the system environment of the whole POD environment site (printing environment in FIG. 1) including a printing system 1000. The embodiment is also applicable to even the printing environment. In the embodiment, a printing environment to which the printing system 1000 is applicable is suited to even the POD environment and will be called a POD system 10000.

Figure 1:
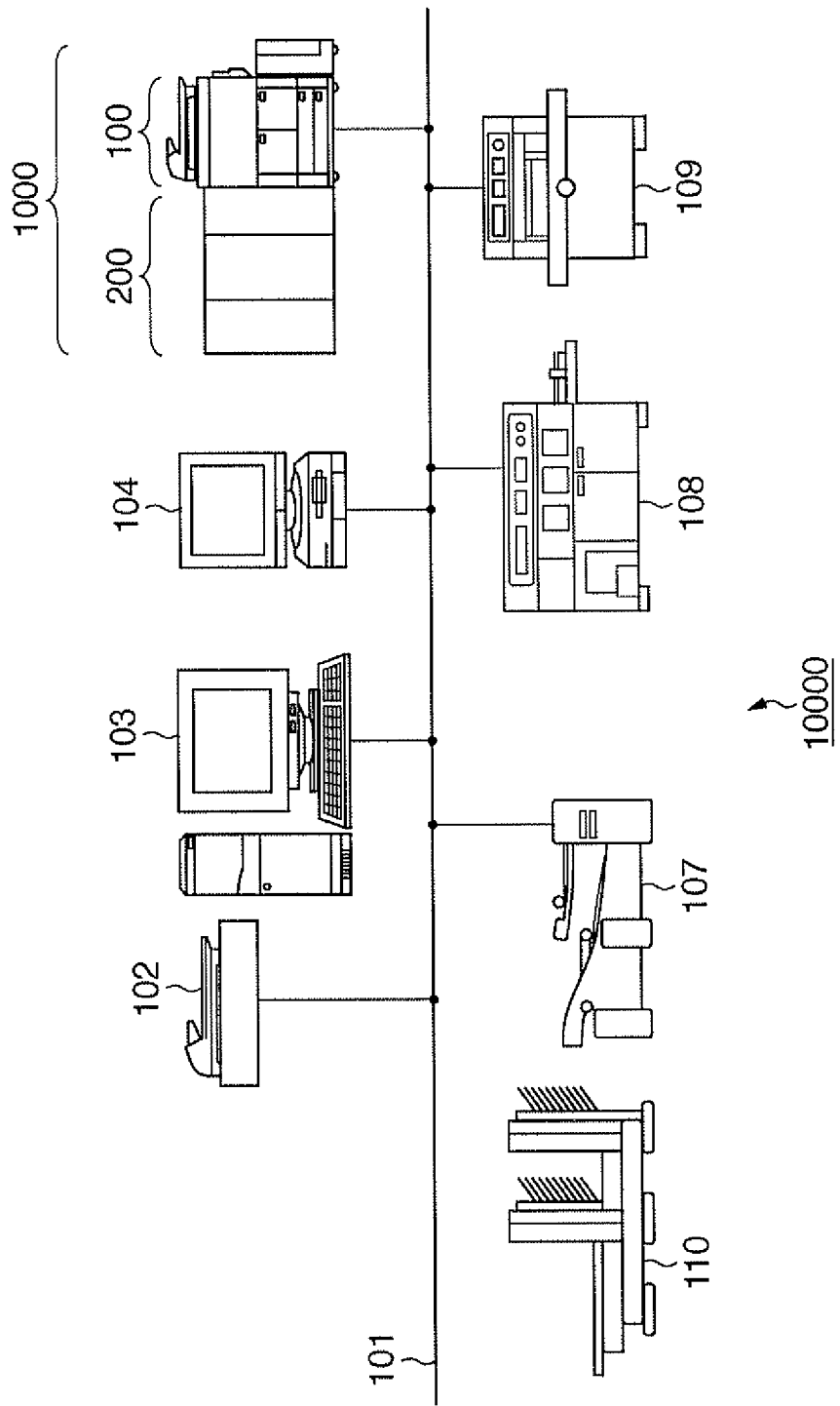
FIG. 1 is a view for explaining an example of the overall configuration of a POD system (printing environment) including a printing system 1000 to be controlled in an embodiment.

The POD system 10000 in FIG. 1 includes, as building components, the printing system 1000, a server computer 103 (to be also referred to as a PC 103), and a client computer 104 (to be also referred to as a PC 104). The server computer 103 and client computer 104 function as information processing apparatuses. The POD system 10000 also includes a paper folding apparatus 107, sheet cutting apparatus 109, saddle stitching apparatus 110, case binding apparatus 108, and scanner 102, which function as post-processing apparatuses. In this way, a plurality of apparatuses are available in the POD system 10000.

The printing system 1000 includes, as building components, a printing apparatus 100 (main body), and a sheet processing apparatus 200 formed from one or a plurality of apparatuses to function as a post-processing apparatus. As the printing apparatus 100, the embodiment will exemplify a multifunction peripheral with a plurality of functions such as a copy function and a PC print function of accepting data from a PC to print. However, the printing apparatus 100 may also be a single-function printing apparatus with only the print function or copy function. The multifunction peripheral will also be called an MFP.

The paper folding apparatus 107, sheet cutting apparatus 109, saddle stitching apparatus 110, and case binding apparatus 108 in FIG. 1 are defined as sheet processing apparatuses, similar to the sheet processing apparatus 200 of the printing system 1000. This is because these devices can execute sheet processes for job sheets (print sheets) printed by the printing apparatus 100 of the printing system 1000. For example, the paper folding apparatus 107 can fold sheets printed by the printing apparatus 100. The sheet cutting apparatus 109 can cut a bundle of sheets printed by the printing apparatus 100. The saddle stitching apparatus 110 can saddle-stitch sheets printed by the printing apparatus 100. The case binding apparatus 108 can case-bind sheets printed by the printing apparatus 100.

In the embodiment, the control unit of the printing system comprehensively controls the printing apparatus 100 and sheet processing apparatus 200. For example, a controller 205 in the printing apparatus 100 in FIG. 2 executes the comprehensive control. In the embodiment, the aforementioned sheet processing apparatuses will also be called post-processing apparatuses or post-presses.

All these apparatuses in the POD system 10000 of FIG. 1 except for the saddle stitching apparatus 110 are connected to a network 101 to communicate data with each other.

For example, the printing apparatus 100 prints print data of a target job which is transmitted via the network 101 from an information processing apparatus serving as an exemplary external apparatus such as the PC 103 or 104 to request execution of printing.

The server computer 103 can manage all target jobs in the POD system 10000 (printing environment) by exchanging data with another apparatus by network communication. In other words, the server computer 103 functions as a computer for comprehensively managing a series of workflow steps including a plurality of processing steps. The server computer 103 determines post-processing conditions capable of finishing in the POD system 10000 (printing environment) based on a job instruction accepted from an operator. In addition, the server computer 103 designates a post-processing (finishing process) step as requested by an end user (customer who requests printing in this case). At this time, the server computer 103 uses information exchange tools such as JDF to exchange information with respective post-processing devices using commands and statuses in post-presses.

For example, the server computer 103 can execute, for printed media of a job having undergone print processing by the printing apparatus 100, various sheet processes such as cutting, saddle stitching, case binding, sheet folding, punching, sealing, and collation. A sheet process is possible that comprises a booklet printing style if a booklet is what an end user (customer) wants.

The server computer 103 manages other types of near-line finishers and offline finishers such as a dedicated stapler, dedicated puncher, inserter, and collator. The server computer 103 can grasp device statuses and job statuses from near-line finishers via the network 101 by sequential polling or the like using a predetermined protocol. The server computer 103 can also manage the execution statuses (progresses) of many jobs processed in the POD system 10000 (printing environment).

In the embodiment, different sheet processing apparatuses may execute a plurality of print sheet processes, or one sheet processing apparatus may execute many kinds of print sheet processes. The system may include any of sheet processing apparatuses.

The printing system 1000 in FIG. 1 includes the printing apparatus 100, and the sheet processing apparatus 200 detachable from the printing apparatus 100. The sheet processing apparatus 200 can directly receive, via a sheet conveyance path, job sheets printed by the printing apparatus 100. The sheet processing apparatus 200 executes sheet processing requested by a user together with a print execution request via a user interface for sheets printed by a printer unit 203 of the printing apparatus 100.

[Internal Configuration (Mainly Software Configuration) of Printing System 1000]

The internal configuration (mainly software configuration) of the printing system 1000 will be explained with reference to the system block diagram of FIG. 2. Note that the printing apparatus 100 incorporates all the units of the printing system 1000 shown in FIG. 2 except for the sheet processing apparatus 200 (strictly speaking, a group of sheet processing apparatuses configurable by a plurality of inline type sheet processing apparatuses). In other words, the sheet processing apparatus 200 is detachable from the printing apparatus 100 and can be provided as an option of the printing apparatus 100. This configuration can provide a necessary number (1, 2, . . . , n) of inline finishers necessary in the POD environment.

The printing apparatus 100 incorporates a nonvolatile memory such as a hard disk 209 (to be also referred to as an "HDD") capable of storing a plurality of target job data. The printing apparatus 100 has a copy function of causing the printer unit 203 to print job data accepted from a scanner unit 201 of the printing apparatus 100 under the control of the controller 205. The printing apparatus 100 also has a print function of causing the printer unit 203 to print job data accepted from an external apparatus such as the PC 103 or 104 via an external I/F 202 serving as an example of a communication unit under the control of the controller 205. The printing apparatus 100 is an MFP type printing apparatus (to be also referred to as an image forming apparatus) having a plurality of functions.

In other words, the printing apparatus according to the embodiment can take any configuration of a color or monochrome printing apparatus as long as it can execute a variety of control operations to be described in the embodiment.

The printing apparatus 100 according to the embodiment includes the scanner unit 201 which scans a document image and processes scanned image data. The printing apparatus 100 also includes the external I/F 202 which transmits/receives image data to/from a facsimile device, network connection device, or external dedicated device. The printing apparatus 100 includes the hard disk 209 (HDD) capable of storing image data of jobs to be printed that are accepted from either the scanner unit 201 or external I/F 202. The printing apparatus 100 includes the printer unit 203 which prints target job data stored in the hard disk 209 (HDD) on a print medium. The printing apparatus 100 further includes an operation unit 204 which has a display unit serving as an example of the user interface of the printing system 1000. Other examples of the user interface provided by the printing system 1000 are the display unit, keyboard, and mouse of an external apparatus such as the PC 103 or 104.

The controller (to be also referred to as a control unit or CPU) 205 serving as an example of the control unit of the printing system 1000 comprehensively controls the processes, operations, and the like of various units in the printing system 1000. A ROM 207 stores a variety of control programs necessary in the embodiment, including programs for executing various processes of flowcharts to be described later. The ROM 207 also stores a display control program to display various UI windows on the display unit of the operation unit 204, including a user interface window (to be referred to as a UI window) shown in FIGS. 4 and 5. The controller 205 reads out programs from the ROM 207 and executes them to cause the printing apparatus to perform various operations to be described in the embodiment. The ROM 207 also stores, for example, a program for executing an operation to analyze PDL (Page Description Language) code data received from an external apparatus (e.g., the PC 103 or 104) via the external I/F 202 and rasterize it into raster image data (bitmap image data). These programs are processed by software.

The ROM 207 is a read-only memory which stores in advance various programs such as a boot sequence, font information, and the above-mentioned programs. A RAM 208 is a readable/writable memory which stores image data, various programs, and setting information sent from the scanner unit 201 or external I/F 202 via the controller 205.

The hard disk 209 (HDD) is a large-capacity storage device which stores image data compressed by a compression/decompression unit 210. The hard disk 209 (HDD) can hold a plurality of data such as print data of a target job. The controller 205 controls the printer unit 203 via the hard disk 209 (HDD) to print target job data input via a variety of input units such as the scanner unit 201 and external I/F 202. The controller 205 also controls to transmit job data to an external apparatus via the external I/F 202. In this fashion, the controller 205 controls to execute various kinds of output processes for target job data stored in the hard disk 209 (HDD). The compression/decompression unit 210 compresses/decompresses image data and the like stored in the RAM 208 and hard disk 209 (HDD) in accordance with various compression schemes such as JBIG and JPEG.

With this configuration, the controller 205 serving as an example of the control unit of the printing system controls even the operation of the inline type sheet processing apparatus 200, as shown in FIG. 1. The hardware configuration of the printing system 1000 including a description of this operation will be explained with reference to FIG. 3.

[Apparatus Configuration (Mainly Hardware Configuration) of Printing System 1000]

The configuration (mainly hardware configuration) of the printing system 1000 will be explained with reference to the view of FIG. 3 for explaining the apparatus configuration.

A hardware configuration will be explained with reference to an example wherein the printing apparatus 100 executes print processing before sheet processing is to be executed by the inline type sheet processing apparatuses 200. A paper handling operation before supplying printed job sheets from the printer unit 203 into the sheet processing apparatus 200 will be mainly explained. The controller (to be also referred to as a control unit or CPU hereinafter) 205 in FIG. 2 causes the printing apparatus 100 to execute this operation.

Figure 2:
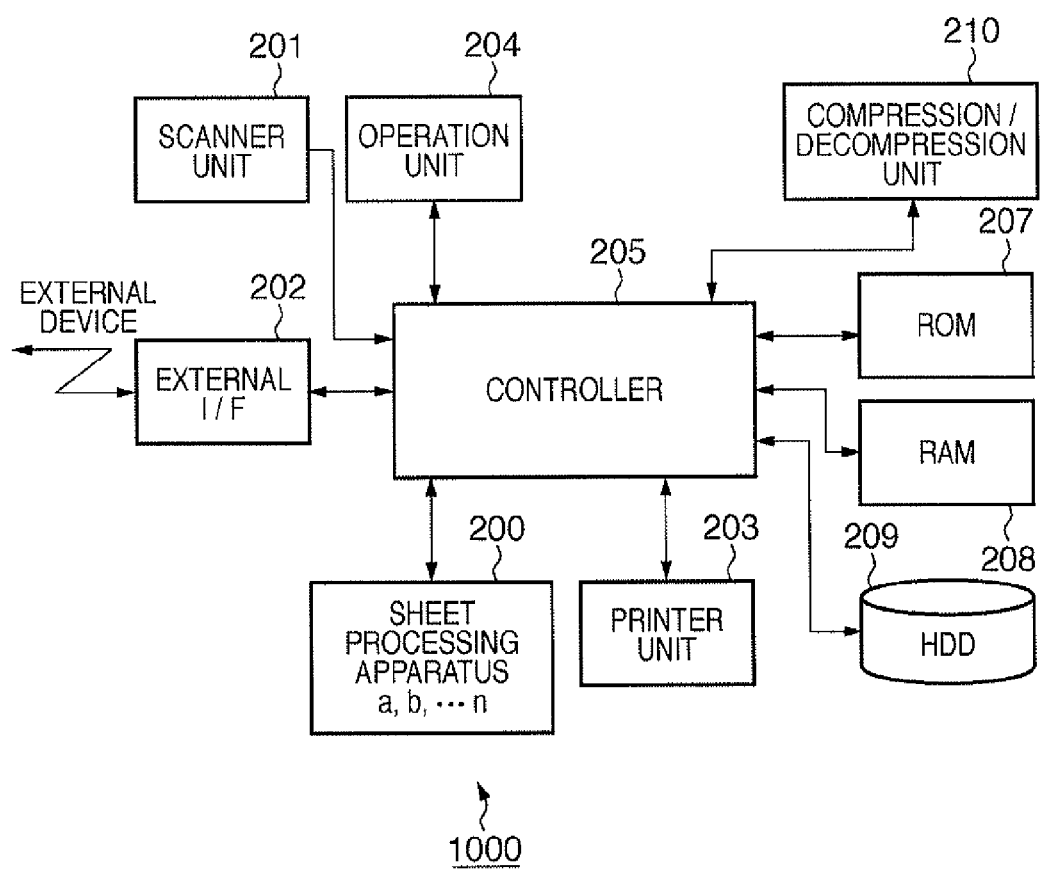
FIG. 2 is a block diagram for explaining an example of the configuration of the printing system 1000 to be controlled in the embodiment.
Figure 3:
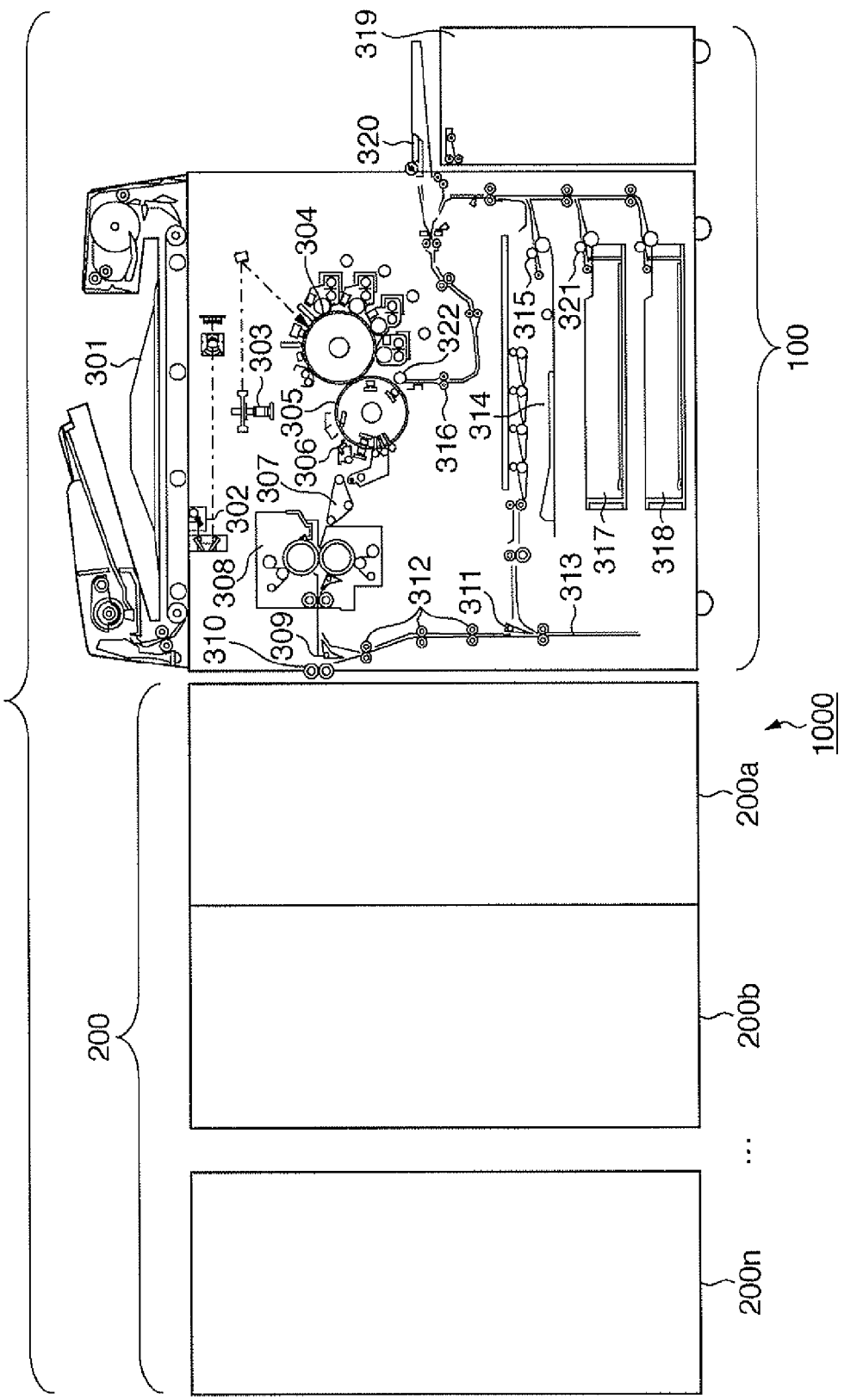
FIG. 3 is a view for explaining an example of the configuration of the printing system 1000 to be controlled in the embodiment.

Of reference numerals 301 to 322 shown in FIG. 3, reference numeral 301 corresponds to the hardware configuration of the scanner unit 201 in FIG. 2. Reference numerals 302 to 322 correspond to the hardware configuration of the printer unit 203 in FIG. 2. The embodiment will describe the structure of a 1D (Drum) color MFP. A 4D (Drum) color MFP and monochrome MFP are also examples of the printing apparatus in the embodiment, but a description thereof will be omitted.

The auto document feeder (ADF) 301 in FIG. 3 separates a document bundle set on the support surface of a document tray in page order from the first page, and feeds each document sheet to an original plate to scan it by the scanner 302. The scanner 302 scans the image of the document sheet fed onto the original plate, and converts it into image data by a CCD. The rotating polygonal mirror (e.g., polygon mirror) 303 receives a light ray (e.g., a laser beam) modulated in accordance with the image data, and irradiates the photosensitive drum 304 with the scan beam reflected by a reflecting mirror. A latent image formed by the laser beam on the photosensitive drum 304 is developed with toner, and the toner image is transferred onto a sheet material adhered onto the transfer drum 305. A series of image forming processes is executed sequentially with yellow (Y), magenta (M), cyan (C), and black (K) toners, forming a full-color image. After four image-forming processes, the sheet material bearing the full-color image on the transfer drum 305 is separated by the separation gripper 306, and conveyed to the fixing unit 308 by the pre-fixing conveyor 307.

The fixing unit 308 is formed from a combination of rollers and belts, and incorporates a heat source such as a halogen heater. The fixing unit 308 fuses and fixes, by heat and pressure, toner on a sheet material bearing a toner image. The discharge flapper 309 can swing about the swing shaft, and regulates the sheet material conveyance direction. When the discharge flapper 309 swings clockwise in FIG. 3, a sheet material is conveyed straight and discharged from the apparatus by the discharge rollers 310. When forming images on the two surfaces of a sheet material (i.e. both sides of a sheet of paper), the discharge flapper 309 swings counterclockwise in FIG. 3 to change the course of the sheet material to downwards. Then, the sheet material is supplied to a double-sided conveyor. The double-sided conveyor includes the reversing flapper 311, reversing rollers 312, reversing guide 313, and double-sided tray 314.

The reversing flapper 311 can swing about a swing shaft, and regulates the sheet material conveyance direction. When processing a double-sided print job, the controller 205 controls the reversing flapper 311 to swing counterclockwise in FIG. 3 and supply a sheet with the first surface printed by the printer unit 203 to the reversing guide 313 via the reversing rollers 312. While the reversing rollers 312 clamp the trailing end of the sheet material, the reversing rollers 312 temporarily stop. The reversing flapper 311 swings clockwise in FIG. 3, and the reversing rollers 312 rotate back. As a result, the sheet is switched back to replace its trailing and leading ends. Then, the sheet is guided to the double-sided tray 314.

The double-sided tray 314 temporarily supports the sheet material, and re-feed roller 315 supplies the sheet material again to registration rollers 316. At this time, the sheet material is sent with a surface opposite to the first surface in the transfer step facing the photosensitive drum. By the same process as that described above, the second image is formed on the second surface of the sheet. After the images are formed on the two surfaces of the sheet material, the sheet is discharged from the printing apparatus main body via the discharge rollers 310 after a fixing process. The controller 205 executes this double-sided print sequence. The printing apparatus can therefore execute double-sided printing of target job data on the first and second surfaces of a sheet.

The sheet feed/conveyance section includes: the paper cassettes 317 and 318 (each capable of storing, for example, 500 sheets) serving as paper feed units for storing sheets necessary for print processing; the paper deck 319 (capable of storing, for example, 5,000 sheets); and the manual feed tray 320. Units for feeding sheets from these paper feed units are the paper feed rollers 321, registration rollers 316, and the like. The paper cassettes 317 and 318 and the paper deck 319 allow setting sheets of various materials at various sheet sizes discriminately in the respective paper feed units.

The manual feed tray 320 also allows the setting of various kinds of print media including a special sheet such as an OHP sheet. The paper feed rollers 321 are arranged in the paper cassettes 317 and 318, paper deck 319, and manual feed tray 320, respectively. The paper feed roller 321 can successively feed sheets one by one. For example, a pickup roller picks up stacked sheet materials sequentially. While a separation roller facing the paper feed roller 321 prevents double feed, the sheet materials are supplied one by one to the conveyance guide. The separation roller receives a driving force via a torque limiter (not shown) to rotate the separation roller in a direction opposite to the conveyance direction. When only one sheet material enters a nip formed between the separation roller and the paper feed roller, the separation roller rotates in the conveyance direction following the sheet material.

If double feed occurs, the separation roller rotates in a direction opposite to the conveyance direction to set back the double-fed sheet material and supply only one top sheet material. The supplied sheet material is guided between the conveyance guides and conveyed to the registration rollers 316 by a plurality of conveyance rollers. At this time, the registration rollers 316 stop, and the leading end of the sheet material abuts against the nip formed between a pair of registration rollers 316. Then, the sheet material forms a loop to correct a skew. The registration rollers 316 start rotating to convey the sheet material in synchronism with the timing to form a toner image on the photosensitive drum 304 in the image forming section. An attraction roller 322 electrostatically attracts the sheet material sent by the registration rollers 316 onto the surface of the transfer drum 305. The sheet material discharged from the fixing unit 308 is introduced into the sheet conveyance path in the sheet processing apparatus 200 via the discharge rollers 310.

Through this print process, the controller 205 processes a job consisting of printing.

The controller 205 causes the printer unit 203 by the above-described method to print job print data stored in the hard disk 209 (HDD). The job print data comes from a data generation source in response to a print execution request accepted from a user via the UI.

For example, the data generation source of a job may be the scanner unit 201 and a print execution request may be received from the operation unit 204. The data generation source of a job, to which a print execution request is accepted from a host computer, means the host computer.

The controller 205 stores print data of a target job sequentially from the first page onwards in the hard disk 209 (HDD). The controller 205 reads out the print data of the job from the hard disk 209 (HDD) in order from the first page, and forms the image of the print data on a sheet. In addition, the controller 205 supplies sheets printed sequentially, from the first page to the $n^{th}$ page, to the sheet conveyance path in the sheet processing apparatus 200 with the image surfaces of the sheets facing downwards. For this purpose, immediately before the discharge rollers 310 introduce a sheet into the sheet processing apparatus 200, the controller 205 executes a switchback operation using the discharge flapper 309 and reversing rollers 312, etc. to reverse the sheet travelling from the fixing unit 308.

The arrangement of the inline type sheet processing apparatuses 200 in the printing system 1000 including the printing apparatus 100 will be explained. As shown in FIG. 3, the printing system 1000 in the embodiment includes a total of n inline type sheet processing apparatuses 200 cascade-connectable to the printing apparatus 100. The number of installed inline sheet processing apparatuses is flexible.

This mechanism aims at improving user-friendliness and is not an essential constituent feature. In other words, the present invention should not be interpreted restrictively to the above-described arrangement. For example, the present invention may adopt a system configuration in which the number of inline sheet processing apparatuses available in the printing system 1000 and the connection order of these apparatuses are fixed. The present invention includes any system configurations and apparatus arrangements as long as the system can execute at least one of various job control operations to be described later.

[Arrangement of Operation Unit 204]

The operation unit 204 serving as an example of the user interface (to be referred to as a UI) of the printing apparatus 100 in the printing system 1000 will be explained with reference to FIGS. 4 and 5.

The operation unit 204 includes a key input section 402 capable of accepting a user operation with hard keys, and a touch panel section 401 serving as an example of a display unit capable of accepting a user operation with soft keys (display keys).

Figure 5:
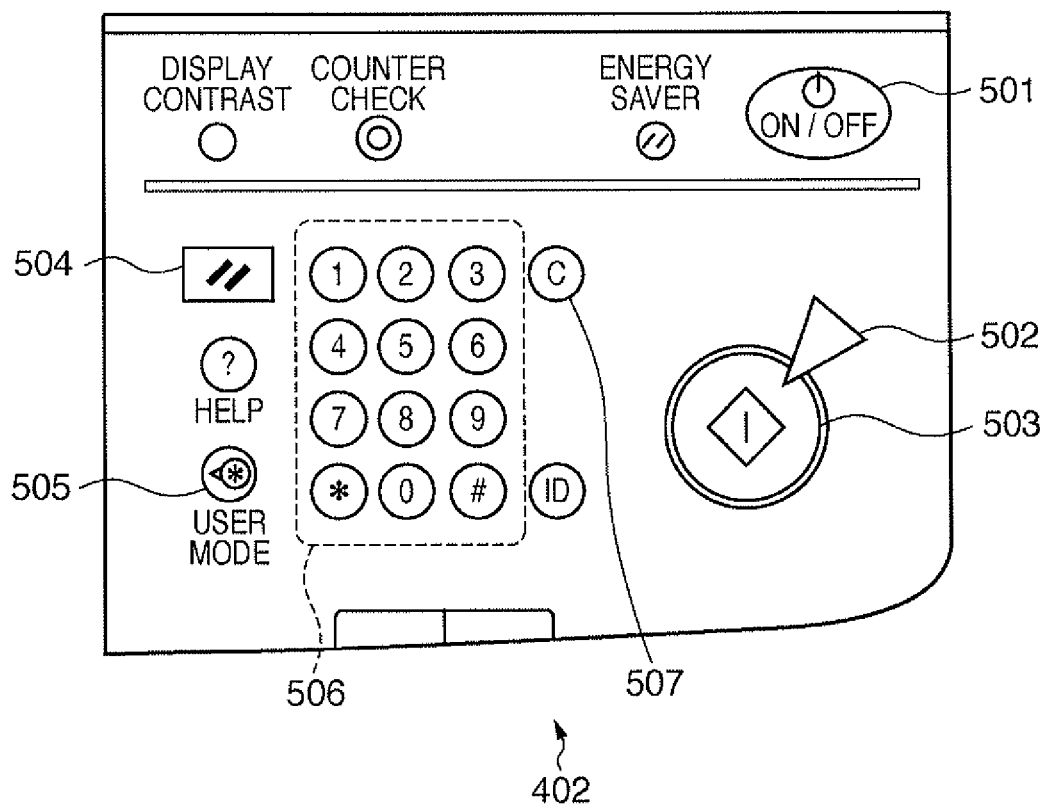
FIG. 5 is a view for explaining an example of the UI to be controlled in the embodiment.

As shown in FIG. 5, the key input section 402 includes an operation unit power switch 501. In response to a user operation to the operation unit power switch 501, the controller 205 controls the apparatus to cause it selectively to switch between the standby mode and the sleep mode. The standby mode is a normal operation state. The sleep mode is a state in which power consumption is suppressed by stopping programs, causing them to wait for an interruption by network printing, facsimile transmission, or the like. The controller 205 controls the apparatus to cause it to accept a user operation of the operation unit power switch 501 while a main power switch (not shown) for supplying power to the whole system is ON.

A start key 503 enables the acceptance of an instruction from a user to cause the printing apparatus to start a job processing designated by that user, such as copying or transmission of a target job. A stop key 502 enables the acceptance of an instruction from the user to cause the printing apparatus to suspend the processing of an accepted job. A ten-key pad 506 allows the user to set the entries of various settings. A clear key 507 is used to cancel various parameters such as entries set by the user via the ten-key pad 506. A reset key 504 is used to accept, from the user, an instruction to invalidate various settings made by the user to a target job and restore the set values to defaults. A user mode key 505 is used to shift to a system setup window for each user.

[Control Executed by Controller 205]

The controller 205 executes the following exemplary control in the printing system 1000 having the above-described system configuration with an eye toward the POD market.

FIG. 6 exemplifies a variety of programs which are stored in the ROM 207 in FIG. 2, and read out and executed by the controller 205 in the printing system 1000, and data used by the programs and the like. As shown in FIG. 6, the ROM 207 stores programs for implementing various functions which can be provided by the printing system 1000.

A boot loader 3101 is a program executed immediately when the printing system 1000 is turned on. The boot loader 3101 is a program for executing various startup sequences necessary to start up the system. An operating system 3102 provides an execution environment for various programs which implement the functions of the printing system 1000. The operating system 3102 mainly provides a function of managing the memory resource of the printing system 1000, and a function of performing basic input/output control of a variety of devices shown in FIG. 6. The memory of the printing system 1000 includes, for example, the ROM 207, RAM 208, and hard disk 209 in FIG. 2.

A data transmission/reception program 3103 is a control program to perform transmission/reception processing upon receiving a data input/output request via the external I/F 202 in FIG. 2. More specifically, the data transmission/reception program 3103 is a control program which contains a protocol stack such as TCP/IP and controls communication of various data with a connected external device or the like via the network 101 in the POD system 10000 (printing environment) shown in FIG. 1. This communication processing is specialized in communication processing in an HTTP server and at the transmission/reception level of data packets input/output between the printing system 1000 and the network 101. The communication processing does not include processing to analyze received data contents, which will be described later. The controller 205 executes the data analysis processing based on the description contents of another program, which will be described later.

A device management function program 3104 integrally manages the connection states, statuses, and capabilities of various devices, the devices being managed by the printing system 1000 to implement the functions of the MFP. These devices include detachable and non-detachable devices such as the printer unit 203, scanner unit 201, and sheet processing apparatus 200. The device management function program 3104 runs when the controller 205 activates the system or is notified of a change of the state of a connected device.

A copy function program 3105 causes the controller 205 to execute the copy function in accordance with an instruction from the operation unit 204 when the user designates execution of the copy function via the operation unit 204.

A scan function program 3106 causes the controller 205 to execute the scan function in accordance with an instruction from the operation unit 204 when the user designates execution of the scan function via the operation unit 204.

A PDL print function program 3107 causes the controller 205 to execute the PDL print function in accordance with an instruction from the operation unit 204 upon receiving PDL print job data via the external I/F 202.

A JDF print function program 3108 causes the controller 205 to execute the JDF print function in accordance with an instruction from the operation unit 204 upon receiving JDF-containing job data via the external I/F 202. The controller 205 controls the apparatus to cause it to execute JDF print processing by sequentially instructing device resources in the printing system 1000. The sequential instructions are for the execution of operations in an appropriate order based on a processing order and processing conditions described in the JDF print function program 3108. The device resources for executing the JDF print function include, for example, the sheet processing apparatus 200, printer unit 203, hard disk 209 (HDD), compression/decompression unit 210, and RAM 208.

A BOX function program 3109 causes the controller 205 to execute a BOX function in accordance with an instruction from the operation unit 204 when the user of the printing system 1000 designates execution of the BOX function via the operation unit 204.

Figure 4:
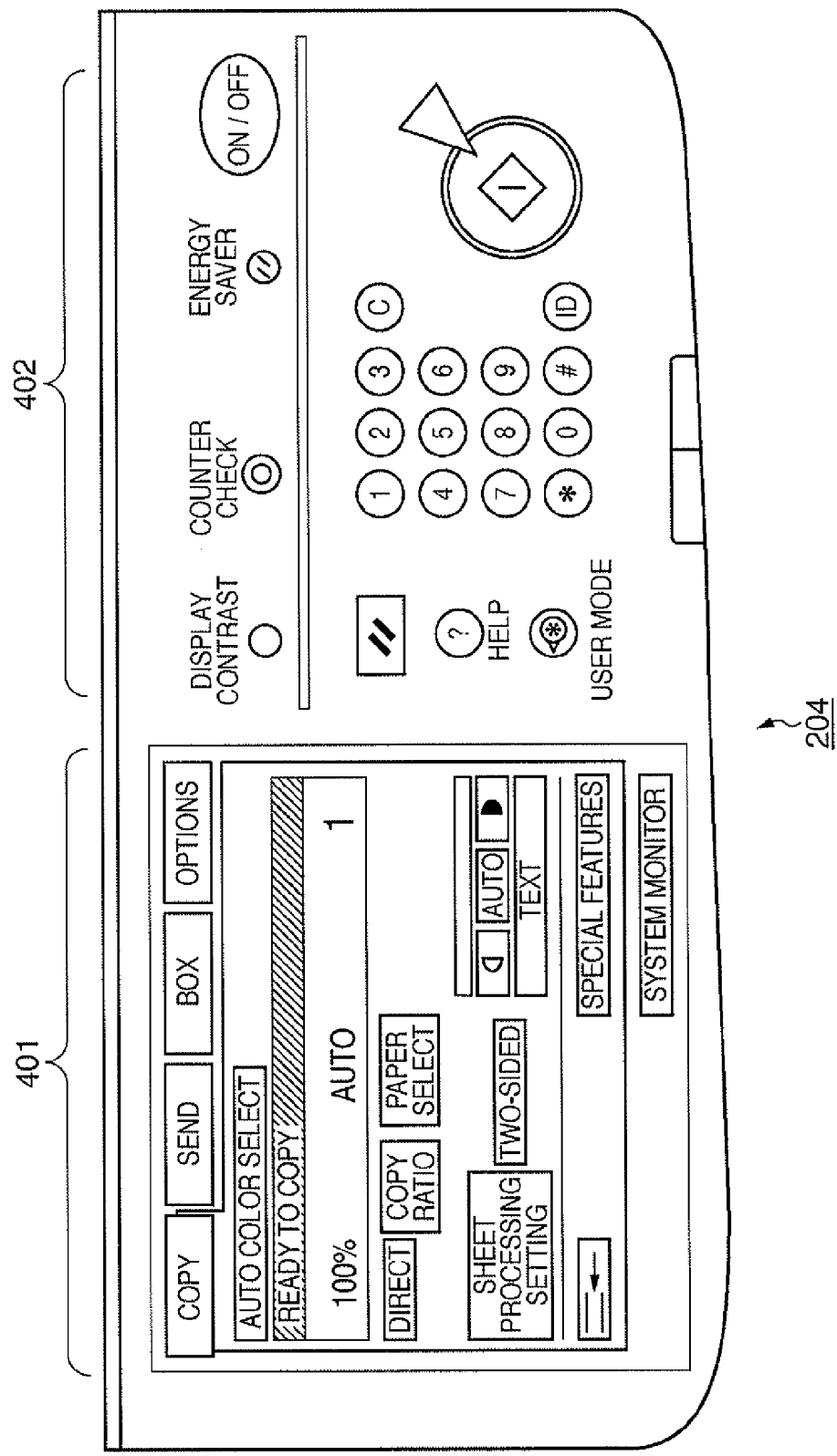
FIG. 4 is a view for explaining an example of a user interface (UI) to be controlled in the embodiment.

A UI control program 3110 is a control program for the touch panel section 401 and key input section 402 of the operation unit shown in FIGS. 4 and 5 when the printing system is completely activated and can provide the functions of the MFP.

Another control program 3111 implements functions not supported by any of the above-described programs, and executes various operations. However, details of the control program 3111 are not important for describing the effects of the embodiment, and a description thereof will be omitted.

A mounted option capability table 3112 is table information which statically holds device information of apparatuses detachable from the printing system 1000. The ROM 207 stores the device information so that the controller 205 in the printing system 1000 refers to it to perform processing to, for example, change processing contents in accordance with the capability of a mounted option when executing various jobs or managing devices. The table is named a mounted option capability table. Mounted options are not limited to apparatuses designed to be detachable, like a large-volume stacker, glue binding apparatus, and saddle stitching apparatus. For example, this table may manage the printing apparatus 100 and the scanner of the printing apparatus 100 as special mounted options. The embodiment will describe a case in which a single table manages information on the printing apparatus 100 similarly to detachable apparatuses.

[Various Data Stored in Hard Disk 209]

Figure 7:
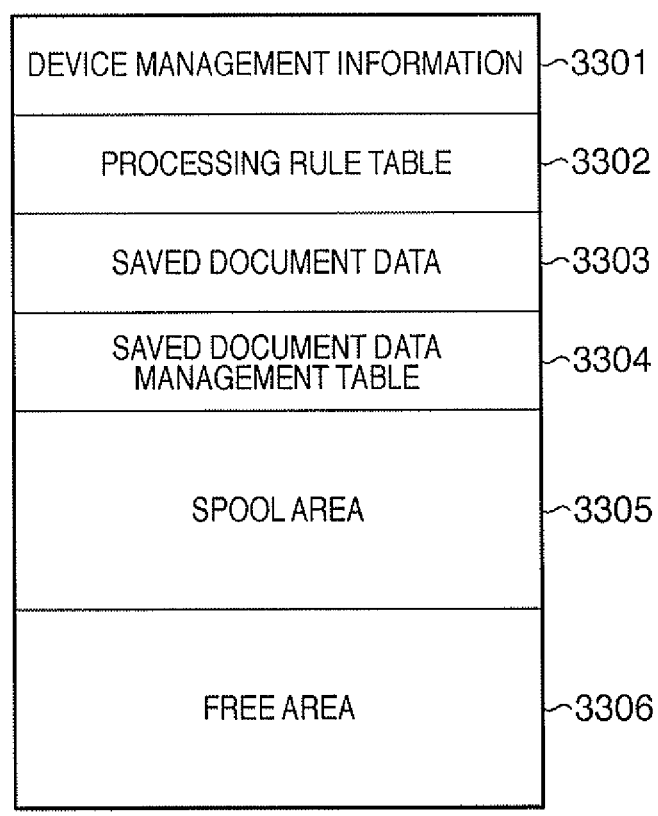
FIG. 7 is a view for explaining various data stored in a hard disk 209 (HDD) included in the configuration of the printing system 1000 to be controlled in the embodiment.

FIG. 7 exemplifies the storage status of various data which are stored in the hard disk 209 in FIG. 2, and read out or written by the controller 205 in the printing system 1000. Information stored in the hard disk 209 dynamically changes depending on the device use status, device configuration, and job progress, unlike the internal state of the ROM 207 shown in FIG. 6. Thus, FIG. 7 shows a state of the data stored in the hard disk 209 at a time when the printing system 1000 is running. The internal state of the hard disk 209 is not always the same as that in FIG. 7. For example, upon accepting a plurality of large-volume print jobs, a free area 3306 shown in FIG. 7 may contain some of the data of the large-volume print jobs, changing the free capacity within it.

The device management information area 3301 stores information such as the connection state of the sheet processing apparatus 200 detachable from the printing system 1000, and the connection state, status, and capability of an optional device that depends on the configuration of the printing system 1000. The device management information 3301 stores a valid device capability information ID uniquely representing information such as the connection state, status, and capability of a current device. The valid device capability information ID may be binary data expressing the contents of the device management information 3301 or the update date and time of the device management information 3301. The valid device capability information ID is used to determine whether a client computer has created a JDF based on the latest device capability information. The device management function program 3104 shown in FIG. 6 manages the device management information 3301. Information stored and managed in the device management table will be described later. When and how the controller 205 uses information in this table will also be described later.

A processing rule table 3302 describes operation specifications concerning the operation of a device when the printing system 1000 tries to process a JDF print job but cannot physically execute it at job settings owing to the device configuration, device capability, or the like. Information stored in the processing rule table 3302 will be described later. When and how the controller 205 uses information in this table will also be described later. Job execution control based on the processing rule table is not limited to a JDF print job. It is also possible to define a processing rule table concerning another job type, and execute a job of this type similarly to the JDF print job. The embodiment targets only the JDF print job for descriptive convenience.

Saved document data 3303 corresponds to document data held in the printing system using the BOX function provided by the BOX function program 3109 shown in FIG. 6. A following saved document data management table 3304 holds management information of the saved document data 3303.

A spool area 3305 temporarily holds print data transmitted to the printing system 1000 until the completion of executing the job. The print data includes one transmitted by the PDL print function provided by the PDL print function program 3107 shown in FIG. 6, or one transmitted by the JDF print function provided by the JDF print function program 3108. Upon completion of executing the print job, the print job data is deleted from the spool area 3305 to free the area for a subsequent print job. The controller 205 controls the hard drive to cause it to store data in the spool area 3305 and free the spool area 3305 upon completion of the job while executing the PDL print function and JDF print function.

The free area 3306 corresponds to an area in the hard disk 209 left over after all the areas described above have been allocated for storage. The capacity of this area changes along with the progress of processing in the printing system 1000. The free area 3306 may run out and disappear depending on the use load of the hard disk 209.

[Various Data to be Processed by Printing System 1000]

Figure 8:
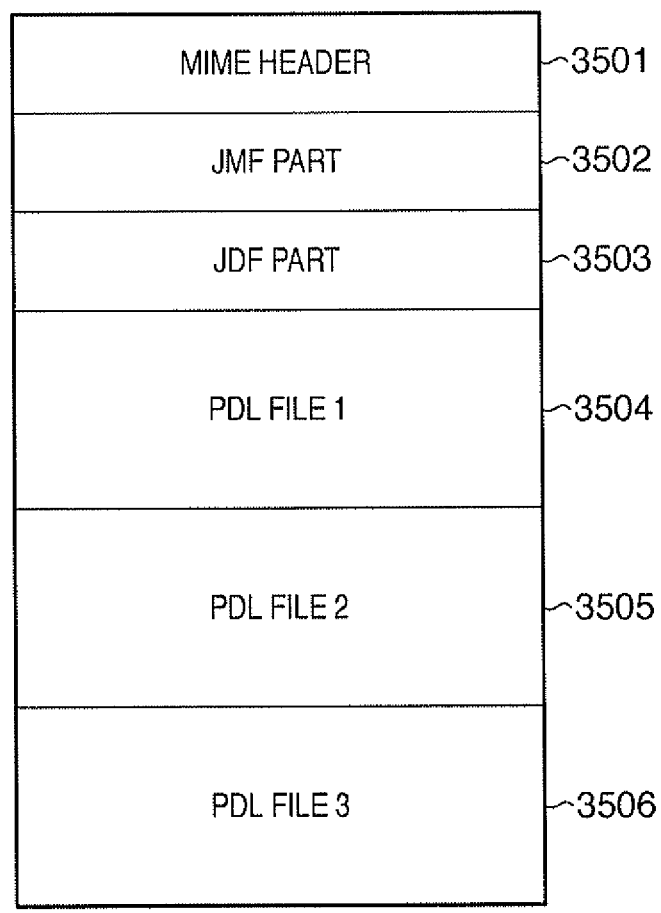
FIG. 8 is a view for explaining the structure of job data of a JDF print job processible by the printing system 1000 to be controlled in the embodiment.

FIG. 8 exemplifies the structure of job data to be processed by the JDF print function provided by the JDF print function program 3108 shown in FIG. 6. A JDF print job is based on the premise that the following components are assembled into a single package in a MIME format. The following data encoded in the MIME format is accepted:
 content data corresponding to image information to be printed;
 a JDF area holding only job setting information; and
 a management area for communication and status management between POD workflows.

The JDF print function in the embodiment also assumes processing of job data in the MIME format. JDF specifications refer to handling of job data other than a MIME package. However, data packaging specifications are not essential for describing the effects of the embodiment, so job data of the MIME format will be explained. However, it is possible to input a JDF job in a format other than the MIME format.

A MIME header 3501 is a header area always necessary when assembling a plurality of parts into a single package in the MIME format. The MIME header 3501 stores MIME management information such as the total data size of the MIME package.

A JMF part 3502 is an area storing the above-mentioned management information for communication and status management between POD workflows.

JMF stands for Job Messaging Format which is the format of messages exchanged between processes and devices in a JDF workflow.

A JDF part 3503 is an area holding the aforementioned job setting information. A JDF specification form issued by CIP4 as JDF specifications describes setting information held in JDF and the format of the setting information. The JDF print function in the printing system 1000 is assumed to be implemented based on matters described in the specification form, and a detailed description thereof will be omitted. As a minimum example for describing the effects of the embodiment, an example of the JDF is shown in drawings subsequent to FIG. 8, and its outline will be explained later.

A PDL file 1 3504, PDL file 2 3505, and PDL file 3 3506 are content data to be printed. In the example of FIG. 8, the MIME package contains three content data. However, the specifications do not limit the number of PDL content parts, and the same processing applies to even more than the three contents of FIG. 8. Depending on JDF specifications, PDL contents are held not in the MIME package but in an external file system or the like. The JDF describes only the URL of the file held in the external file system or the like. Some specifications designate processing content data by pulling a file held in the external file system or the like based on the URL. The JDF print function in the printing system 1000 can also process this function. Since the basic operation is the same, details of the content file pulling operation will not be described in the embodiment. The specifications of the MIME format are defined by RFC (Request for Comments), and a detailed description thereof will be omitted.

FIGS. 9A and 9B show an example of the JDF description contents of the JDF part 3503 in the MIME package in FIG. 8. Needless to say, the JDF shown in FIGS. 9A and 9B is merely a specific example of the JDF description based on JDF specifications, and the JDF description is not limited to it. In other words, the exemplary JDF shown in FIGS. 9A and 9B merely contains minimum contents to efficiently describe the following functions.

The JDF part shown in FIGS. 9A and 9B is mainly made up of the following four parts:
 a JDF node 3701 storing JDF management information;
 an audit pool 3702 storing a job log;
 a resource link pool 3703 describing the relationship between resources and processes; and
 a resource pool 3704 storing setting information.

In the present embodiment, information stored in the JDF node 3701 contains a device management information ID stored in device capability information referred to by a client computer to create a JDF. The device management information ID is used to determine device capability information used by a client computer to create a JDF. In the embodiment, an attribute refDevCapID corresponds to the device management information ID. Each part has specifications, described contents, schema, etc., compliant with JDF specifications. The JDF specifications are described in the JDF specification form, so details thereof will not be described in the embodiment of the present invention.

FIG. 10 is a view showing a specific example of a device capability information notification request received by the I/F 202 from an external device. Device capability information shown in FIG. 10 is a specific example of a device capability information description based on JDF specifications, and the device capability information is not limited to it. In other words, the exemplary device capability information shown in FIG. 10 has minimum contents to efficiently describe the following functions.

The device capability information notification request shown in FIG. 10 is roughly formed from the following two parts:
- a JDF node 3711 storing management information of the device capability information notification request; and
- an inquiry node 3712 storing the inquiry contents of the device capability information notification request.

Each part contains specifications, described contents, schema, etc. compliant with JDF specifications. The JDF specifications are described in the JDF specification form, so details thereof will not be described in the embodiment of the present invention.

The device management function program 3104 shown in FIG. 6 implements the device management function. FIGS. 11A and 11B show an example of the description contents of device capability information generated by the device management function as a result of executing the device management function program 3104. The device capability information shown in FIGS. 11A and 11B is a specific example of a device capability information description based on JDF specifications, and the device capability information is not limited to it. In other words, the exemplary device capability information shown in FIGS. 11A and 11B has minimum contents to efficiently describe the following functions.

The device capability information shown in FIGS. 11A and 11B is roughly formed from the following two parts:
- a JMF node 3721 storing management information of the device capability information; and
- a device capability node 3722 storing JDF specifications processible by the printing system 1000.

In the embodiment, information stored in the device capability node 3722 contains a device management information ID. The device management information ID is used to determine device capability information used by a client computer to create a JDF. In the embodiment, an attribute DevCapID corresponds to the device management information ID. Each part contains specifications, described contents, schema, etc. compliant with JDF specifications. The JDF specifications are described in the JDF specification form, so details thereof will not be described in the embodiment of the present invention.

FIG. 12 is a table for explaining details of information stored and managed in the mounted option capability table 3112 shown in FIG. 6. The mounted option capability table 3112 is made up of four fields, and pieces of information in the four fields are managed and stored for each connected device.

A device type field 3901 is used to identify the type of sheet processing apparatus 200 mountable in the printing system 1000 and the type of detachable device such as the paper deck 319 shown in FIG. 3. Strictly speaking, the main body of the printing apparatus 100 is not a mounted option. However, in the embodiment, the printing apparatus 100 is regarded as a special mounted option for easy management by a single table and managed in this table. If mounted options and the printing apparatus 100 is to be discriminated and managed exactly, the table shown in FIG. 12 is divided into two to manage them. However, the embodiment will not exemplify this case. In the description of FIG. 12, both detachable devices and the printing apparatus 100 will be referred to as a device altogether.

A category field 3902 stores a category to which a device described in the device type field 3901 belongs. For example, the following categories can be defined as ones to be stored, and the category field 3902 stores one of them:
- a printing apparatus capable of printing on the paper surface;
- a deck dedicated to only stocking media to be printed;
- a stacker capable of holding many output printed media; and
- a finisher capable of performing processes such as folding, binding, and punching for various kinds of output sheets.

There is a printing apparatus which has a paper feed port and can feed paper without attaching any deck. In practice, the printing system 1000 according to the embodiment includes the paper cassettes 317 and 318, as shown in FIG. 3. When managed by the table, even such a device is categorized not as a deck but as a printing apparatus. In other words, the mounted option capability table 3112 is managed such that each device is always classified into one of the four categories.

A function field 3903 stores the types of functions provided by a device. Since functions by a device change depending on the category to which the device belongs, the contents of the table in FIG. 12 reflect them. In other words, the mounted option capability table 3112 is managed such that devices belonging to the same category have the same set of function fields.

A support status field 3904 holds flag information representing whether each device can implement a function described in the function field 3903. Possible values are a value meaning OK when the device supports the function, and a value meaning UNSUPPORTED when it does not support the function. Data in the mounted option capability table 3112 in FIG. 6 stored in the ROM 207 is a specific binary numerical value. Thus, the character string "OK" or "UNSUPPORTED" itself shown in FIG. 12 is not stored. For descriptive convenience, the embodiment adopts the expressions "OK" and "UNSUPPORTED" as values equivalent to binary numerical values as if the character string "OK" or "UNSUPPORTED" were stored. This expression merely aims at easy understanding of the embodiment. In the following description of the embodiment, the same description method applies to a value stored in the table.

The mounted option capability table 3112 shown in FIG. 12 stores information on five types of devices. The five types of devices are an MFP main body 3905, large-volume paper deck 3906, large-volume stacker 3907, glue binding apparatus 3908, and saddle stitching apparatus 3909. Of these devices, the glue binding apparatus and saddle stitching apparatus belong to the same category "finisher", as shown in FIG. 12.

FIG. 13 is a table for explaining the contents of a device configuration management table. The device configuration management table is managed by the device management function program 3104 shown in FIG. 6, and held (stored) in the RAM 208 according to the method and conditions described with reference to the device management function program 3104 in FIG. 6. The device configuration management table manages the connection states of the detachable sheet processing apparatus 200 installed in the printing system 1000, the paper deck 319 shown in FIG. 3, a subdevice of the printing apparatus 100, and the like. This table is made up of three fields, which will be described below.

A device name field 4101 lists all devices detachable from the printing system 1000. When devices of the same type are attachable, they are managed distinctively with (alphanumerical) figures added to the end of their device names. The printing system 1000 allows selecting a complicated combination of options to meet a user need. However, not all devices can always be combined depending on their types, and some combinations are impossible owing to the physical or device configuration, as described above. The device name field 4101 shown in FIG. 13 does not manage the validity of each combination, and only lists all devices which may be installed in the printing system 1000. Whether each device is actually mounted is indicated by a value in another field (connection state—see later) of this table.

A device type field 4102 stores the category of a device described in the device name field 4101. The device type field 4102 stores a value equivalent to the contents of the category field 3902 in the mounted option capability table shown in FIG. 12.

A connection state field 4103 stores whether a device described in the device name field 4101 is connected to the printing apparatus. A possible value is a value meaning OK when a device described in the device name field 4101 that supports a target function is connected to the printing apparatus. Another possible value is a value meaning not connected when a device described in the device name field 4101 is not connected to the printing apparatus. In the example of the table in FIG. 13, one scanner and one large-volume stacker are connected in the printing system 1000.

FIG. 14 is a table for explaining the detailed contents of information stored in the processing rule table 3302 which is stored in the hard disk 209 and has already been described with reference to FIG. 7. As shown in FIG. 14, this table is made up of three fields, which will be described below.

A function field 4301 holds the type of setting attribute of a function necessary to execute a job settable by a JDF. In FIG. 14, 16 different setting items are registered. The number of setting items processable by an actual JDF print job is larger than that shown in FIG. 14. However, only limited types of setting attributes will be exemplified for descriptive convenience, and the effects of the embodiment will be explained based on them.

An operation specification field 4302 in the case of not supporting a designated function describes the contents of processing which should be employed when the printing system 1000 cannot execute a designated function and the controller 205 is to execute a JDF print job input to the printing apparatus. For each print function, the operation specification field 4302 stores a value corresponding to operation designation information which designates an operation performed when the printing apparatus cannot provide a print function necessary to satisfy designated printing conditions. This field takes the following three values:

"operate at a default value": The first value represents that, when no target function is executable, the default value of a device replaces the setting value of the function in a JDF to continue the job.

"ignore": The second value represents that, when no target function is executable, the JDF is assumed not to have the setting of the function, thereby continuing the job.

"cancel job": The third value represents that, when no target function is executable, execution of a job by a JDF having the setting of the function is canceled.

In the embodiment, the system sets in advance a value in the operation specification field in the case of not supporting a designated function that corresponds to each function described in the function field 4301. However, the system may allow the user to change a value in this field.

A default value field 4303 in FIG. 14 stores a default value selected when the "operation specification in the case of not supporting a designated function" field 4302 takes the value "operate at a default value". When the operation specification field 4302 takes another value, the field 4303 is blank.

FIG. 15 shows a case in which all values in the operation specification field 4302 in the case of not supporting a designated function are set to "cancel job" as an operation performed when functions described in the function field 4301 cannot be executed due to the device configuration or capability, etc. of the printing system 1000 in FIG. 14. Job cancellation processing is done according to the description contents of the processing rule table when the JDF designates a non-executable function while the processing rule table stores information shown in FIG. 15. By changing the processing rule table, processing to continue or cancel a job when the JDF designates a non-executable function can be controlled.

FIG. 16 is a table for explaining details of a JDF analysis result table generated upon completion of analyzing the JDF part 3503 in job data shown in FIG. 8 when a JDF print job is input. The JDF print job is input via the external I/F 202 connected to an external device, based on processing of the JDF print function program 3108 which is stored in the hard disk 209 and executed by the controller 205 in FIG. 2. As shown in FIG. 16, this table is made up of three fields, which will be described below.

A function field 4501 stores the type of setting attribute of each function that is turned out as a result of analyzing a JDF. An analysis result field 4502 stores the analysis result of a JDF in accordance with the type in the function field 4501. An execution possible/impossible field 4503 stores a result of determining, for each setting item, whether to continuously execute a JDF print job by collating the analysis result of each function with the function field of the processing rule table by the controller 205. A value is set in the execution possible/impossible field 4503 upon completion of JDF part analysis processing. The analysis result of each function is stored in, for example, the analysis result field 4502. FIG. 14 exemplifies the processing rule table. The execution possible/impossible field 4503 takes the following three values:

OK: This value represents that a job can continue as a result of collating the analysis result of a JDF part for a given function with the operation specification field in the case of not supporting the function in the processing rule table shown in FIG. 14.

UNSUPPORTED: This value represents that a job cannot continue and needs to be canceled as a result of collating the analysis result of a JDF part for a given function with the operation specification field in the case of not supporting the function in the processing rule table shown in FIG. 14.

N/A: This value represents that a target function does not concern determination of whether a job can continue because, for example, the function is not set from the beginning or is not supported by the printing system 1000.

The JDF analysis result table shown in FIG. 16 is an example generated when the JDF exemplified in FIGS. 9A and 9B is analyzed while the device configuration management table shown in FIG. 13 is in a state shown in FIG. 13. The JDF in FIGS. 9A and 9B designates execution of center folding by saddle stitching, but the device configuration management table shown in FIG. 13 shows that a finisher capable of executing center folding is not mounted. In this case, the value is "cancel job" in the operation specification field in the case of not supporting the saddle stitching function in the processing rule table shown in FIG. 14. Thus, the value in the execution possible/impossible field for the saddle stitching function in FIG. 16 is UNSUPPORTED. That is, when the printing system 1000 has a configuration and state shown in FIG. 13, a JDF print job containing the JDF exemplified in FIGS. 9A and 9B is not executed but canceled.

[Operation under Control of Controller 205]

(Basic Processing)

Figure 17:
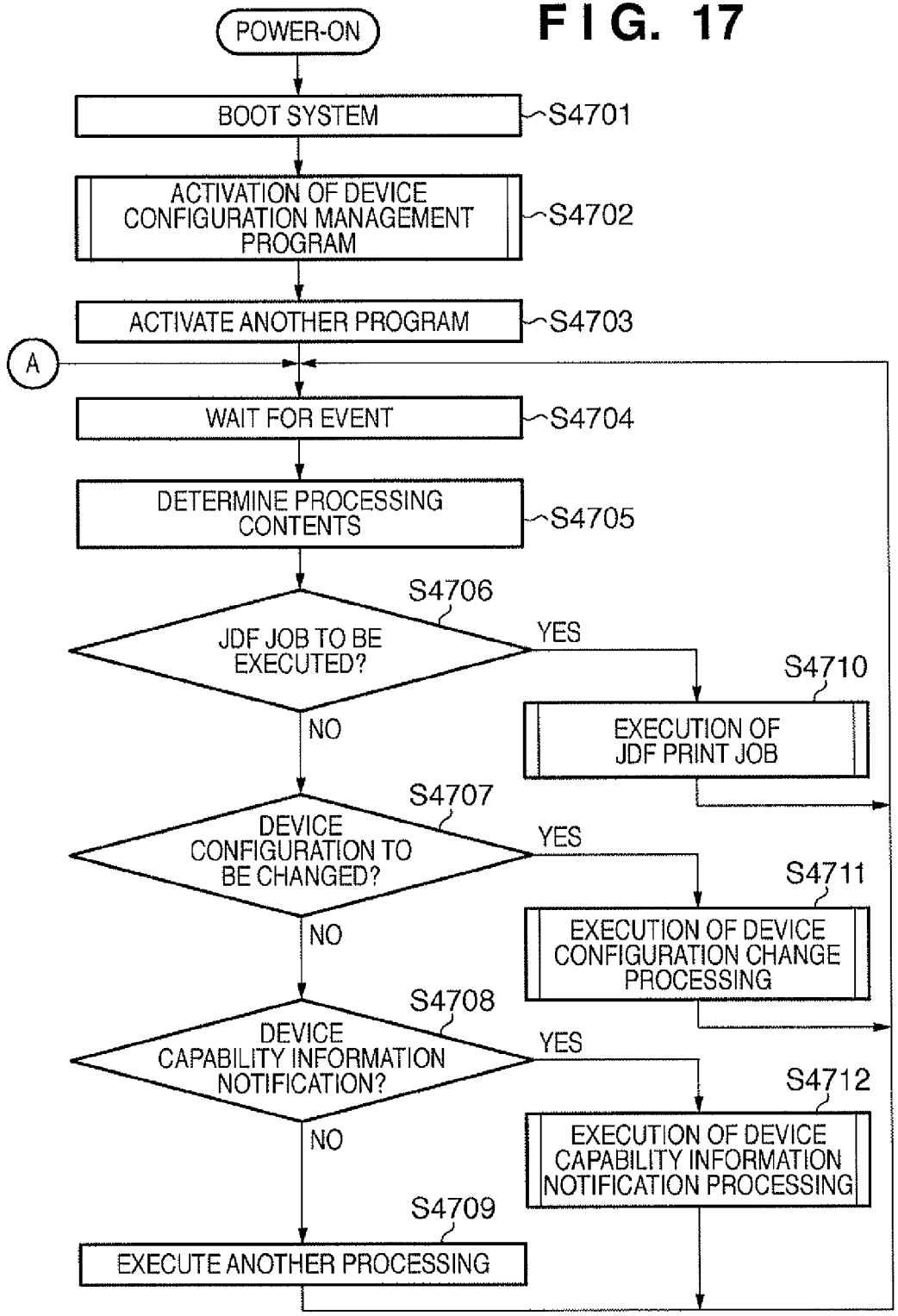
FIG. 17 is a flowchart for explaining the operation of the overall printing system controlled by a controller 205 of the printing system 1000 to be controlled in the embodiment.

A print job processing method in the printing system 1000 under the control of the controller 205 will be explained with reference to FIG. 17. FIG. 17 is a flowchart for explaining a processing sequence concerning control of the overall system serving as an MFP after the controller 205 in FIG. 2 activates the system.

Upon power-on, the system is booted (step S4701). More specifically, the controller 205 reads out the boot loader 3101 shown in FIG. 6 from the ROM 207 and executes the readout program. Processes in this step include execution of all initialization processes such as issuing of initialization commands to various devices and resources, etc. connected to the printing system, and cleaning performed immediately after devices are activated. Processes performed by the boot loader 3101 also include a process to read out the operating system 3102 (FIG. 6) from the HDD 209 (HDD) by the controller 205 and start the services of the operating system.

Upon completion of the boot processing, the controller 205 reads out the device management function program 3104 from the ROM 207 and executes it (step S4702). According to the device management function program 3104 executed in this step, the controller 205 checks the device connection state and creates the device configuration management table shown in FIG. 13 in the RAM 208. Details of the operation in step S4702 will be described later with reference to FIG. 18.

The process advances to step S4703, and the controller 205 reads out other programs from the ROM 207 and executes them. In this step, various programs in FIG. 6 stored in the ROM are loaded except for those which have already been loaded in the preceding steps, but details thereof will be omitted.

At the stage of step S4703, all preparations for the printing system 1000 to function as an MFP are complete, and the process shifts to step S4704 to wait for an event. The event includes any of the following:

a job execution instruction or setting change by the user via the operation unit 204;

a print job input from an external device to the printing system 1000 via the external I/F 202;

reception of a JDF print job and a request to execute the received job;

a processing request such as acquisition of a device status, or change of various kinds of setting information and management information stored in a device, other than input of a job from an external device to the printing system 1000; and a variety of events generated inside the printing system, including the absence of paper and change of a device status, which trigger the printing system to change from the idle state.

In other words, the controller 205 which controls the whole printing system does not shift from step S4704 unless an event occurs.

If any event occurs in the printing system 1000 and the controller 205 is notified of it in step S4704, the process advances to step S4705 and subsequent steps. The controller 205 identifies the generated event and executes an operation corresponding to it.

First, in step S4705, the controller 205 determines the type of event generated in step S4704. Based on the result of the determination in step S4705 upon generation of the event, the controller 205 determines whether the generated event is a JDF job execution start request. The JDF job execution start request is an event issued to the controller 205 when it is determined that the I/F unit 202 in FIG. 2 has received JDF job data from an external device. If the controller 205 determines in step S4706 that the generated event is the JDF job execution start request (YES in step S4706), the process advances to step S4710. If the controller 205 determines in step S4706 that the generated event is not the JDF job execution start request (NO in step S4706), the process advances to step S4707.

In step S4710, the controller 205 executes print processing of the JDF print job input from the external device to the printing system 1000 via the external I/F 202. Details of the operation in step S4710 will be described later with reference to FIG. 19.

If the controller 205 determines in step S4706 that the event determined in step S4705 is not the JDF job execution start request (NO in step S4706), the process advances to step S4707. In step S4707, the controller 205 determines whether the generated event is a change of the device configuration (third determination step). In step S4707, at least one of a change of the device configuration, a change of available print media, a change of the remaining amount of consumables, and a change of the device operation state is detected as a change of a function processible by the printing system. If the controller 205 determines in step S4707 that the generated event is a change of the device configuration (YES in step S4707), the process advances to step S4711 to execute device configuration change processing. Details of the device configuration change processing will be described later with reference to FIG. 21.

If the controller 205 determines in step S4707 that the event determined in step S4705 is not the device configuration change processing (NO in step S4707), the process advances to step S4708. In step S4708, the controller 205 determines whether the generated event is a device capability information notification request. The device capability information notification request is an event issued to the controller 205 when, for example, it is determined that the I/F 202 in FIG. 2 has received the device capability information notification request from an external device. If the controller 205 determines in step S4708 that the generated event is the device capability information notification request (YES in step S4708), the process advances to step S4712 to execute device capability information notification processing. Details of the device capability information notification processing will be described later with reference to FIG. 22.

If the controller 205 determines in step S4708 that the event determined in step S4705 is not the device capability information notification request (NO in step S4708), the process advances to step S4709. In step S4709, the controller 205 executes processing corresponding to the type of generated event except for execution of the JDF job or the device configuration change processing. In this step, processes of various contents may be executed. However, the type and contents of each operation are not important for a description of the embodiment, so these operations are described as a single step. However, this step includes execution of a plurality of processes, as described above.

After the controller 205 completes the processes in steps S4709, S4710, S4711, and S4712, the process moves to step S4704, and the controller 205 waits again for the next event processing.

(Device Configuration Management Processing)

Figure 18:
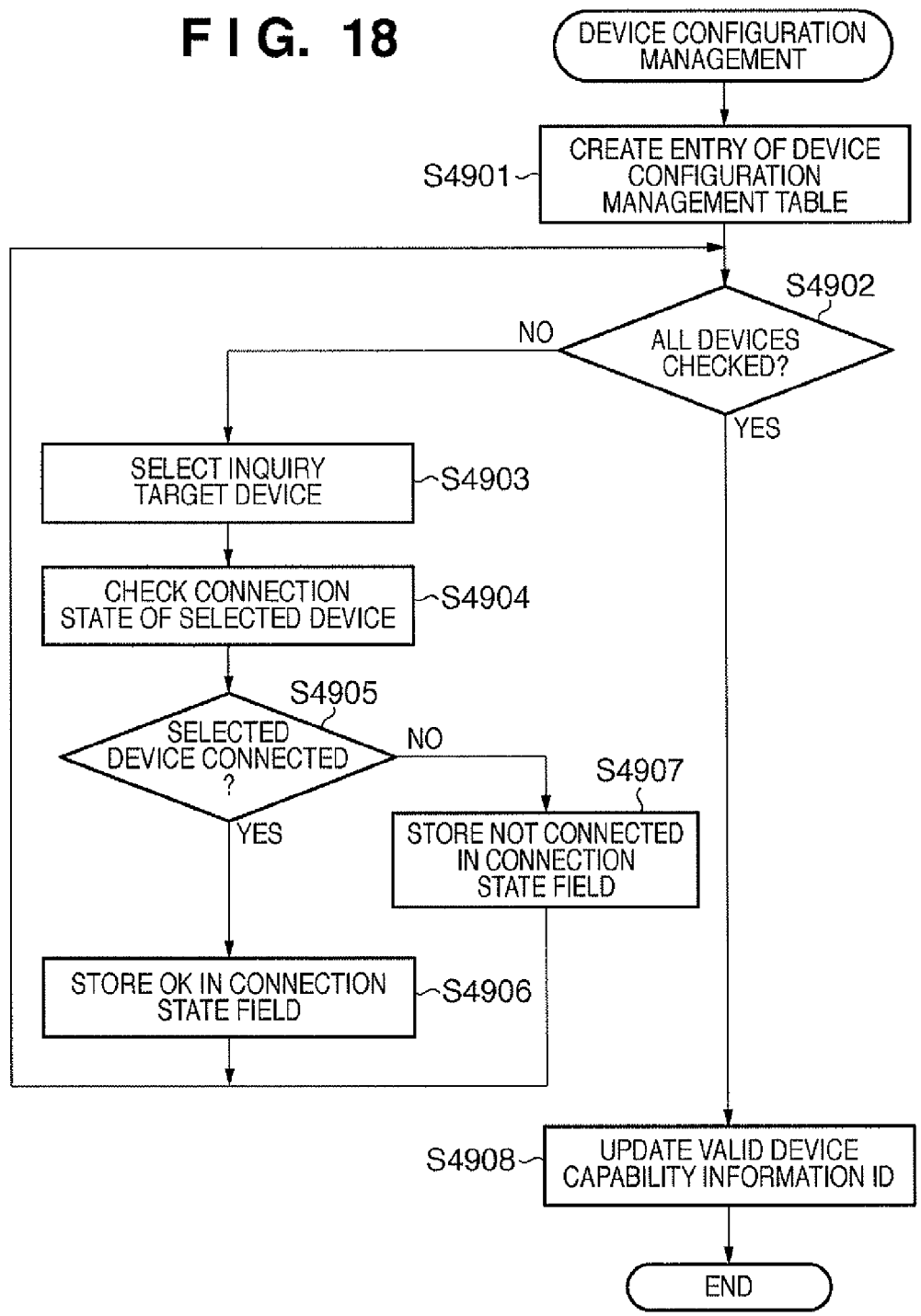
FIG. 18 is a flowchart for explaining the detailed operation of a device configuration management program in step S4702 shown in FIG. 17 in the first embodiment.

FIG. 18 is a flowchart for explaining the detailed operation of the device configuration management program executed by the controller 205 in step S4702 shown in FIG. 17. First, the controller 205 creates the entry of the device configuration management table in the RAM 208. The device configuration management table has already been described in detail with reference to FIG. 13, and a description thereof will not be repeated.

The device configuration management table created in step S4901 stores information in only the device name field 4101 and device type field 4102, and the connection state field 4103 is blank.

Processes in step S4902 and subsequent steps correspond to processing to store an appropriate value in the connection state field 4103. In step S4902 as the first step of this processing, the controller 205 determines whether all devices registered in the device name field 4101 of the device configuration management table have been checked. When the process reaches step S4902 immediately after step S4901, the determination result in step S4902 is always NO.

If the controller 205 determines in step S4902 that a device to be checked still remains (NO in step S4902), the process advances to step S4903 to select an inquiry target device. At this time, devices are selected in order of device names in the device name field 4101 of the device configuration management table created in step S4901.

After executing the processing in step S4903, the controller 205 determines in step S4904 whether the device selected in step S4903 is connected to the printing system 1000. In the determination process executed at this time, the connection state is confirmed in accordance with a specific protocol via a connection unit for electrically connecting devices, a detailed description of which will be omitted. In this step, for example, if the inquiry target device exists, the controller 205 receives a status to this effect and confirms the connection. To the contrary, if no response is sent back to an output inquiry request within a predetermined period and a time-out occurs, the controller 205 determines that the inquiry target device is not connected.

In step S4905, the controller 205 determines the inquiry result of step S4904. If the controller 205 determines that the inquiry target device is connected (YES in step S4905), the process advances to step S4906 to update the status of the device in the connection state field 4103 of the device configuration management table to "OK". If the controller 205 determines that no inquiry target device is connected (NO in step S4905), the process advances to step S4907 to update the status of the device in the connection state field 4103 of the device configuration management table to "not connected".

Upon completion of the processing in step S4906 or S4907, the process returns to step S4902 again to check the next device. Steps S4902 to S4906 and S4907 form a loop, and these steps are iteratively executed until the completion of checking all devices described in the device name field 4101 of the device configuration management table.

If the controller 205 determines in step S4902 that the connection states of all devices have been checked (YES in step S4902), the process advances to step S4908 to update a valid device capability information ID stored in the device management information 3301. After that, the sequence in FIG. 18 ends.

(Print Processing of JDF Print Job)

Figure 19:
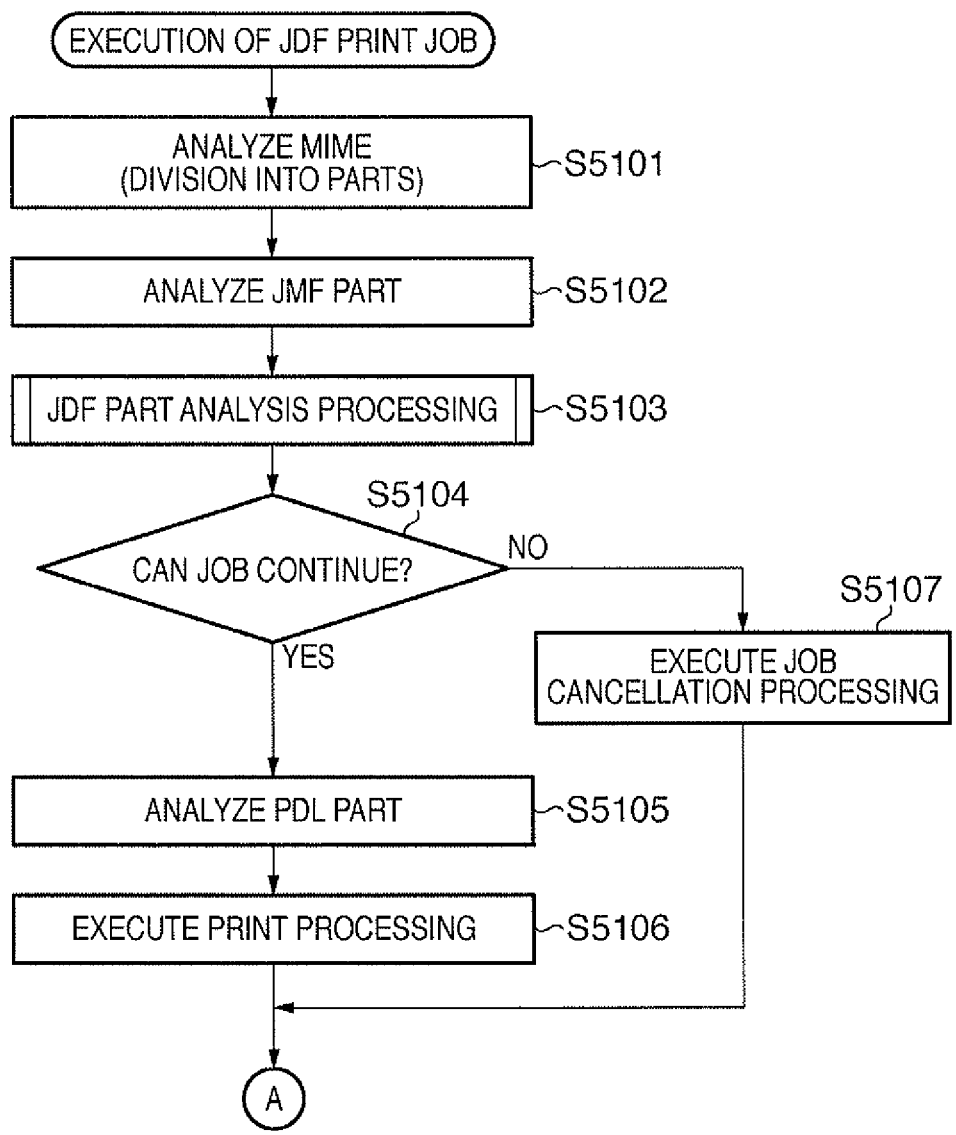
FIG. 19 is a flowchart for explaining a detailed operation of executing a JDF print job in step S4710 shown in FIG. 17 in the first embodiment.

FIG. 19 is a flowchart for explaining a detailed sequence in step S4710 shown in FIG. 17, that is, when the controller 205 executes print processing of a JDF print job input to the printing system 1000.

First, the controller 205 analyzes the MIME format of data building a JDF print job in step S5101. More specifically, the controller 205 extracts contents from received MIME data based on MIME header information (division into parts), and stores the extracted contents in the hard disk 209. In this step, contents extracted from MIME data are three types: JMF, JDF, and PDL contents to be printed. The MIME format permits the presence of one or more PDL contents.

Then, the process advances to step S5102 to analyze the JMF part which has been extracted from the MIME data in step S5101 and is stored in the hard disk 209. The JMF itself is important in managing communication, status, and the like when the JDF workflow system is controlled. However, the JMF is not important in describing the effects of the embodiment, so a detailed description thereof will be omitted.

Upon completion of the JMF part analysis processing in step S5102, the process advances to step S5103 to analyze the JDF part which has been extracted from the MIME data in step S5101 and is stored in the hard disk 209. Detailed processing in step S5103 will be described later with reference to FIG. 20. In the JDF analysis processing in step S5103, the controller 205 also determines whether the received job can be executed, based on setting information described in the JDF, and the device capability and status.

In step S5104, based on setting information described in the JDF determined in step S5103, and the device capability and status, the controller 205 determines whether the received job can be executed, and decides subsequent processing. If the controller 205 determines in step S5104 that the received job can be executed (YES in step S5104), the process advances to step S5105. If the controller 205 determines in step S5104 that the received job cannot be executed (NO in step S5104), the process advances to step S5107.

In step S5105, the controller 205 analyzes PDL contents which have been extracted from the MIME data in step S5101 and which are to be printed. More specifically, the controller 205 analyzes a PDL command and converts it into image data in accordance with the setting information described in the JDF analyzed in step S5103. The controller 205 finally converts the image data into a printable raster image, and stores the converted image data in the hard disk 209. Details of the PDL data analysis processing are not important in describing the effects of the embodiment, so a detailed description thereof will be omitted.

In step S5106, according to the setting information described in the JDF analyzed in step S5103, the controller 205 prints the image data which have been rasterized in step S5105 and is stored in the hard disk 209. That is, the controller 205 performs print processing based on the JDF analysis result table as exemplified in FIG. 16. Of print functions necessary to satisfy printing conditions designated in the JDF, a function which can be provided as designated by the printing system is executed. As for a function which cannot be provided as designated, an operation based on the operation specification field 4302 in the case of not supporting the function is executed. The configuration according to the embodiment can therefore execute appropriate print processing using functions which can be provided by the printing system.

After the end of the processing in step S5106, the process returns to step S4704 in FIG. 17.

If the controller 205 determines in step S5104 that the received job cannot be executed, it cancels execution of the job in step S5107. After the end of the processing in step S5107, the process returns to step S4704 in FIG. 17 (as shown by the reference numeral "A").

(JDF Part Analysis Processing)

Figure 20:
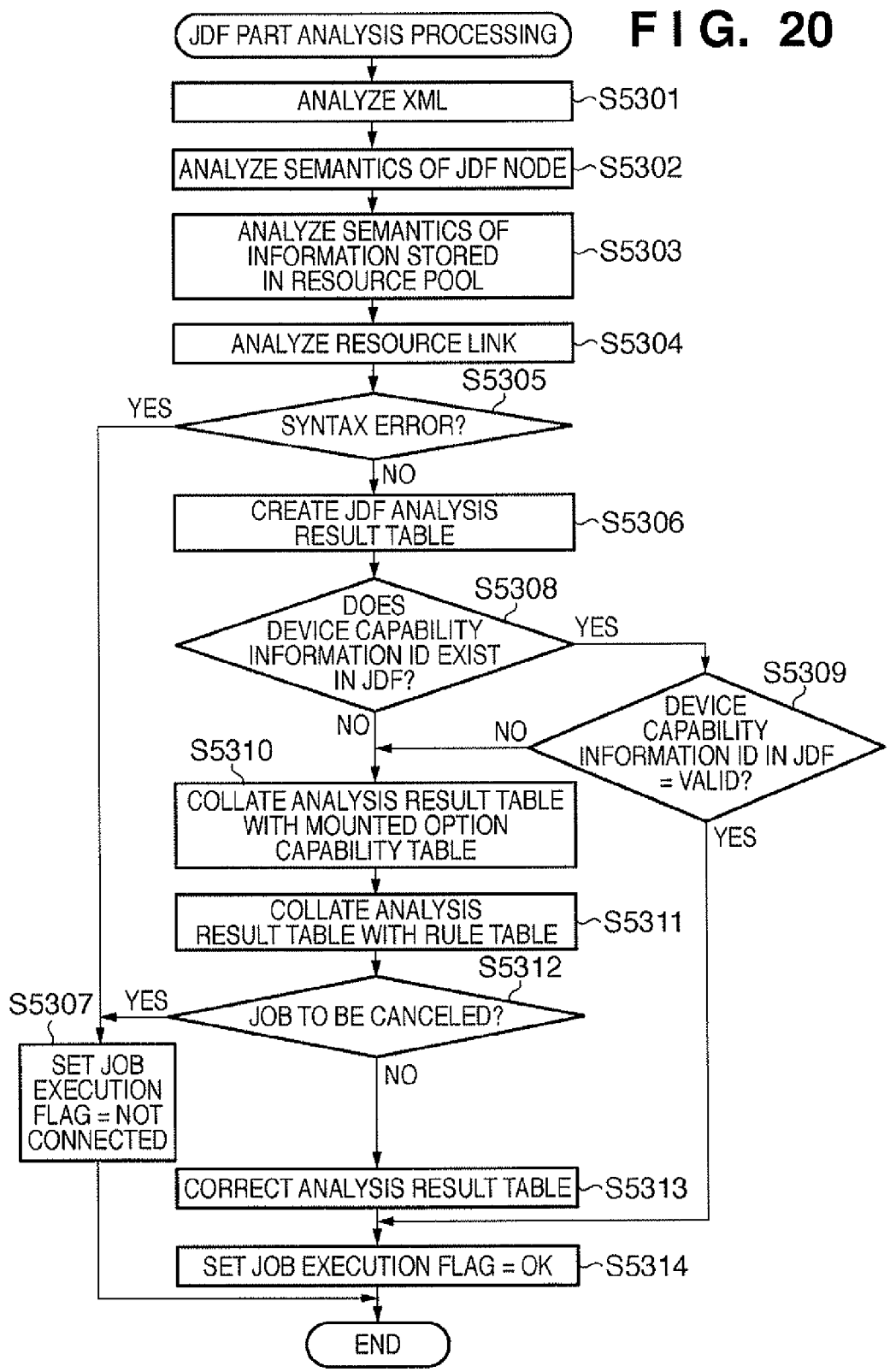
FIG. 20 is a flowchart for explaining the detailed operation of JDF part analysis processing in step S5103 shown in FIG. 19 in the first embodiment.

FIG. 20 is a flowchart for explaining details of the operation in step S5103 of FIG. 19, that is, the JDF part analysis processing. First, the controller 205 analyzes the XML syntax, and loads elements and attribute information described in the JDF into an internal data structure (step S5301).

Then, in step S5302 and subsequent steps, the controller 205 executes semantic analysis processing based on information obtained as a result of the analysis in step S5301. In step S5302, the controller 205 performs semantic analysis processing for a JDF node serving as a root node in the JDF. The JDF node stores information necessary for job management and information on the definition of a target process in the JDF and the like.

In step S5303, the controller 205 performs semantic analysis processing for information in a resource pool serving as the storage location of a setting parameter for job execution in the JDF. The resource pool stores various kinds of setting information which should be reflected in actual PDL rasterization processing, image processing (e.g., imposition), print processing, finishing processing, and the like.

In step S5304, the controller 205 checks whether link information between JDF processes and resources is represented properly and whether there is any inconsistent link setting (resource link analysis). Steps S5301 to S5304 correspond to the syntax analysis and semantic analysis processing of the JDF part.

After the end of the processing in step S5304, the controller 205 determines in step S5305 whether a syntax error (analysis error) has occurred in the processes of steps S5301 to S5304. If the controller 205 determines that an analysis error has occurred (YES in step S5305), no job can be executed. Thus, the process advances to step S5307 to set a job execution flag to "not connected". The job execution flag means data set in a specific area allocated in the RAM 208 in order to execute a program for performing the processing described in the flowchart of FIG. 20 by the controller 205.

If the controller 205 determines in step S5305 that no analysis error has occurred in the processes of steps S5301 to S5304 (NO in step S5305), the process advances to step S5306 to create a JDF analysis result table (S5306). Details of the JDF analysis result table created in this step have already been described with reference to FIG. 16, and a description thereof will not be repeated. Upon completion of the processing in step S5306, the process advances to step S5308.

In step S5308, the controller 205 searches for a device capability information ID as identification information for specifying device capability information, and determines whether the device capability information ID exists in association with the JDF. If the JDF contains the device capability information ID (YES in step S5308), the process advances to step S5309. If the controller 205 determines in step S5308 that the JDF does not contain the device capability information ID (NO in step S5308), the process advances to step S5310.

In step S5309, the controller 205 determines whether the device capability information ID contained in the JDF is valid (in a first determination step). This determination is made depending on whether the device capability information ID contained in the JDF matches a valid device capability information ID stored in the device management information 3301. From this determination result, the controller 205 can determine whether the JDF has been created based on the latest device capability information. When the device capability information ID matches the valid device capability information ID, the printing apparatus (printing system) ensures execution of the print job. If the device capability information ID matches the valid device capability information ID stored in the device management information 3301 (YES in step S5309), the process advances to step S5314 to set the job execution flag to OK. If the device capability information ID does not match the valid device capability information ID stored in the device management information 3301 (NO in step S5309), the process advances to step S5310, similar to the case of NO in step S5308.

As the second determination step, the controller 205 executes processes in steps S5310 to S5312. In step S5310, the controller 205 collates information of the analysis result table created in step S5306 with that of the mounted option capability table shown in FIG. 12. As for job settings stored in the analysis result table, functions which cannot be executed by the current configuration of the printing system 1000 are extracted from functions described in the mounted option capability table.

In step S5311, the controller 205 collates each function which has been extracted in step S5310 and cannot be executed by the current configuration of the printing system 1000, with a corresponding function field of the processing rule table shown in FIG. 14. By this collation, the controller 205 checks operation specifications for each unexecutable setting item. In step S5312, based on the result of the check in step S5311, the controller 205 determines whether job cancel is set as a value in the "operation specification in the case of not supporting the designated function" field 4302 in the processing rule table that corresponds to the function extracted in step S5310.

If the controller 205 determines that there is a job setting which cannot be executed owing to the device configuration or capability and that there is even one function defined to cancel a job when this function is set (YES in step S5312), the process advances to step S5307. In step S5307, the controller 205 cancels the job.

If NO in step S5312, there is a job setting which cannot be executed due to the device configuration or capability but the job need not be canceled. In this case, the job can be executed continuously by selecting a default value in accordance with contents described in the processing rule table or ignoring the setting. Hence, if NO in step S5312, the process advances to step S5313 to correct the contents of the JDF analysis result table in accordance with contents described in the processing rule table shown in FIG. 14. Then, the process advances to step S5314 to set the job execution flag to OK.

(Device Configuration Change Processing)

Figure 21:
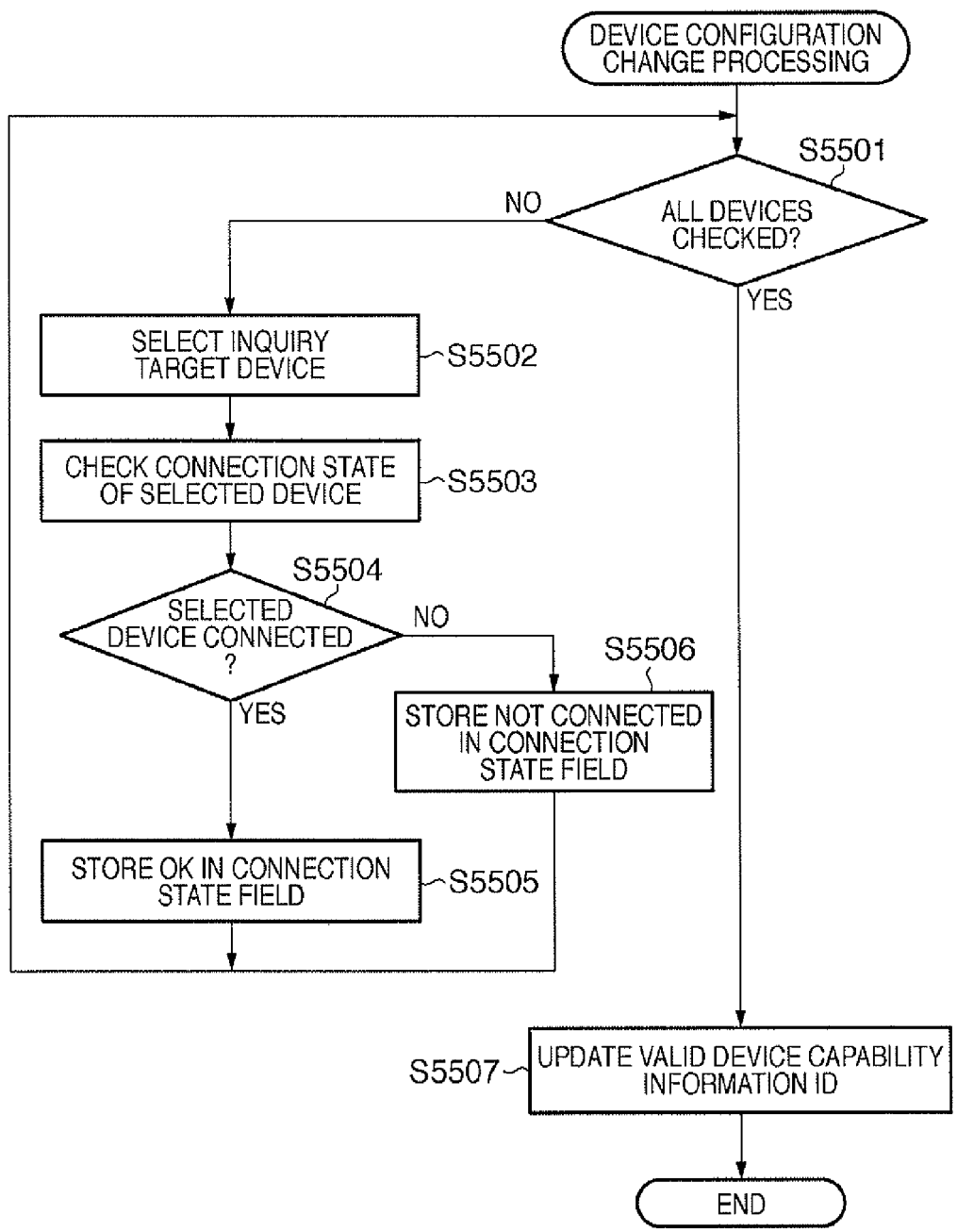
FIG. 21 is a flowchart for explaining the detailed operation of device configuration change processing in step S4711 shown in FIG. 17 in the first embodiment.

FIG. 21 is a flowchart showing details of device configuration management table correction processing in step S4711 of FIG. 17, that is, when the device configuration changes upon activation of the printing system 1000.

If the controller 205 determines in step S5501 that a device to be checked still remains (NO in step S5501), the process advances to step S5502 to select an inquiry target device. At this time, devices are selected in order of device names in the device name field 4101 of the device configuration management table.

In step S5503, the controller 205 determines whether the device selected in step S5502 is connected to the printing system 1000. In the determination process executed at this time, the connection state is confirmed according to a specific protocol via a connection unit for electrically connecting devices, a detailed description of which will be omitted. In this step, if the inquiry target device exists, the controller 205 receives a status to this effect and confirms the connection. To the contrary, if no response is sent back to an output inquiry request within a predetermined period and a time-out occurs, the controller 205 determines that the inquiry target device is not connected.

In step S5504, the controller 205 determines the inquiry result of step S5503. If the controller 205 determines that the inquiry target device is connected (YES in step S5504), the process advances to step S5505 to update the status of the device in the connection state field 4103 of the device configuration management table to "OK". If the controller 205 determines in step S5504 that no inquiry target device is connected (NO in step S5504), the process advances to step S5506. In step S5506, the controller 205 updates the status of the device in the connection state field 4103 of the device configuration management table to "not connected".

Upon completion of the processing in step S5505 or S5506, the process returns to step S5501 again to check the next device. Steps S5501 to S5505 and S5506 form a loop, and these steps are iteratively executed until the checking of all of the devices described in the device name field 4101 of the device configuration management table is completed.

If the controller 205 determines in step S5501 that the connection states of all devices have been checked (YES in step S5501), the process advances to step S5507 to update the valid device capability information ID stored in the device management information 3301. Thereafter, the sequence in FIG. 21 ends.

(Device Capability Information Notification Processing)

Figure 22:
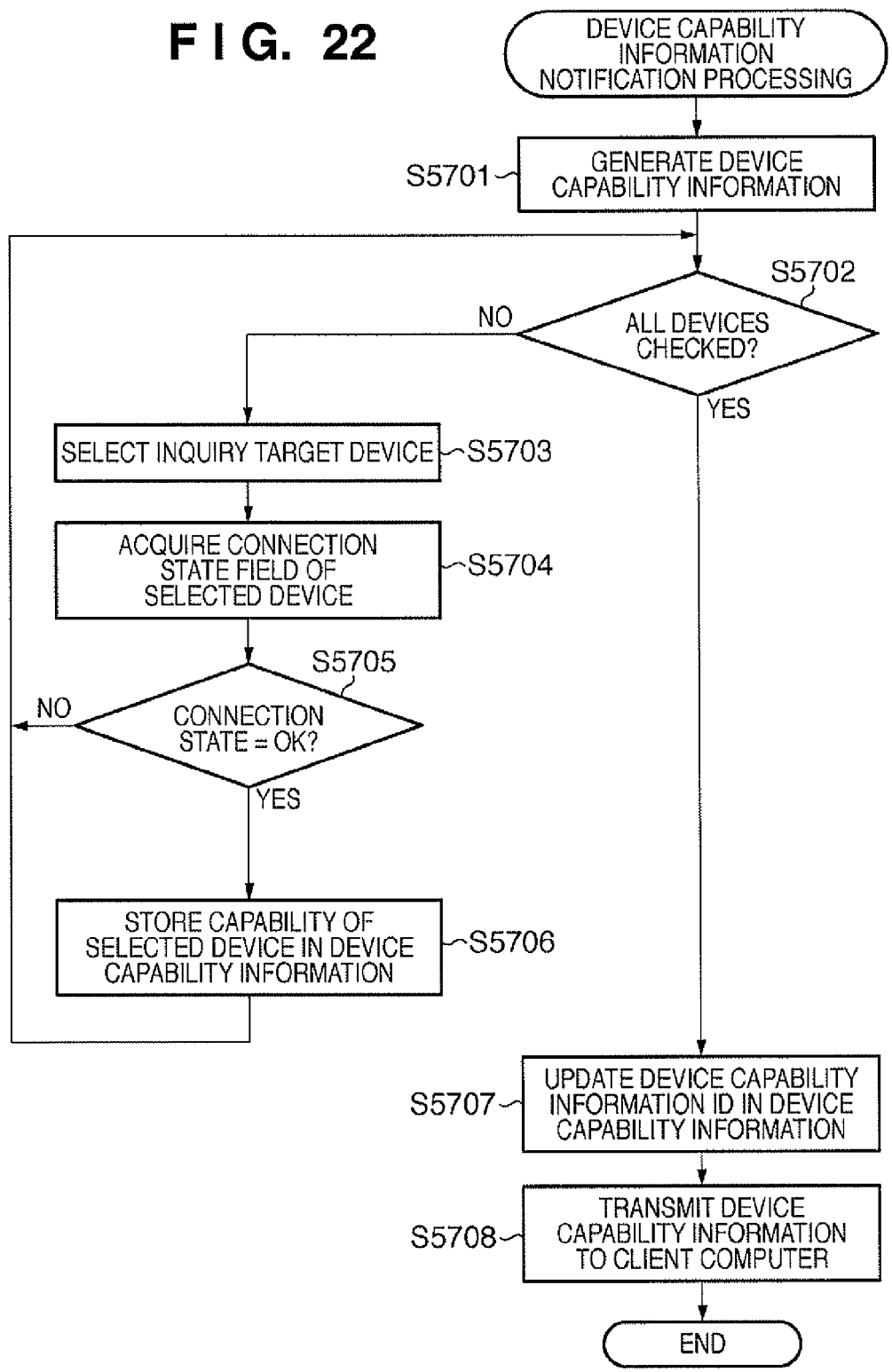
FIG. 22 is a flowchart for explaining the detailed operation of device capability information notification processing in step S4712 shown in FIG. 17 in the first embodiment.

FIG. 22 is a flowchart showing details of device capability information notification processing in step S4712 of FIG. 17, that is, when a device capability information notification request event occurs.

In step S5701, the controller 205 acquires information on a device connected to the printing system and generates device capability information representing functions processable by the printing system. The controller 205 creates device capability information in the RAM 208 to notify the client computer 104 of it. The device capability information created in step S5701 does not reflect the connection state of the device. Processes in step S5702 and subsequent steps correspond to processing to store appropriate information corresponding to the connect state of the device in the device capability information. In step S5702 as the first step of this processing, the controller 205 determines whether all devices registered in the device name field 4101 of the device configuration management table have been checked. As a matter of course, when the process reaches step S5702 immediately after step S5701, the determination result in step S5702 is always NO.

If the controller 205 determines in step S5702 that a device to be checked still remains (NO in step S5702), the process advances to step S5703 to select an inquiry target device. At this time, devices are selected in order of device names in the device name field 4101 of the device configuration management table.

In step S5704, the controller 205 acquires the connection state field 4103 of the device selected in step S5703. In step S5705, the controller 205 determines whether the status of the connection state field 4103 acquired in step S5704 is OK. If the controller 205 determines that the status is OK (YES in step S5705), the process advances to step S5706 to store the capability of the target device in the device capability information. If the controller 205 determines in step S5705 that the status is not connected (NO in step S5705) or the processing in step S5706 is complete, the process returns to step S5702 to check the next device. Steps S5702 to S5706 form a loop, and these steps are iteratively executed until the completion of checking all devices described in the device name field 4101 of the device configuration management table.

If the controller 205 determines in step S5702 that the connection states of all devices have been checked (YES in step S5702), the process advances to step S5707. In step S5707, the controller 205 stores, as a device capability information ID in the device capability information, a valid device capability information ID stored in the device management information 3301.

In step S5708, the controller 205 transmits the device capability information to the client computer 104 on the network 101 via the external I/F 202. After that, the sequence in FIG. 22 ends.

The first embodiment can provide a technique capable of performing proper print processing without bothering the user in a printing system which operates based on a print job describing printing conditions in a general-purpose format.

The first embodiment can contribute to practical use of a product capable of meeting user needs concerning the JDF which may arise in the future in a printing environment, like the POD environment, when a printing apparatus or system is configured to cope with the JDF.

The first embodiment can provide a technique of determining whether the printing apparatus can process a job ticket sent to a device upon a change of JDF specifications processible by the printing apparatus. The printing apparatus can quickly process a job ticket assured to be processible by it, without conducting the device capability information test. This can improve user-friendliness of the device.

<<Second Embodiment>>

The second embodiment will describe a configuration to stop processing of a JDF for which it cannot be confirmed whether the JDF has been created based on the latest device capability information. The second embodiment can provide a technique of stopping processing of a JDF for which it cannot be confirmed whether the printing apparatus can process it upon a change of JDF specifications processible by the printing apparatus. This technique can prevent a failure cost generated by a printed material created differently from an instruction in a printing environment such as the POD environment. The second embodiment can improve user-friendliness of the device.

The arrangement according to the second embodiment is almost the same as that according to the first embodiment. The same reference numerals as those in the first embodiment denote the same parts, and a difference will be described mainly.

[Operation under Control of Controller 205]

(JDF Part Analysis Processing)

Figure 23:
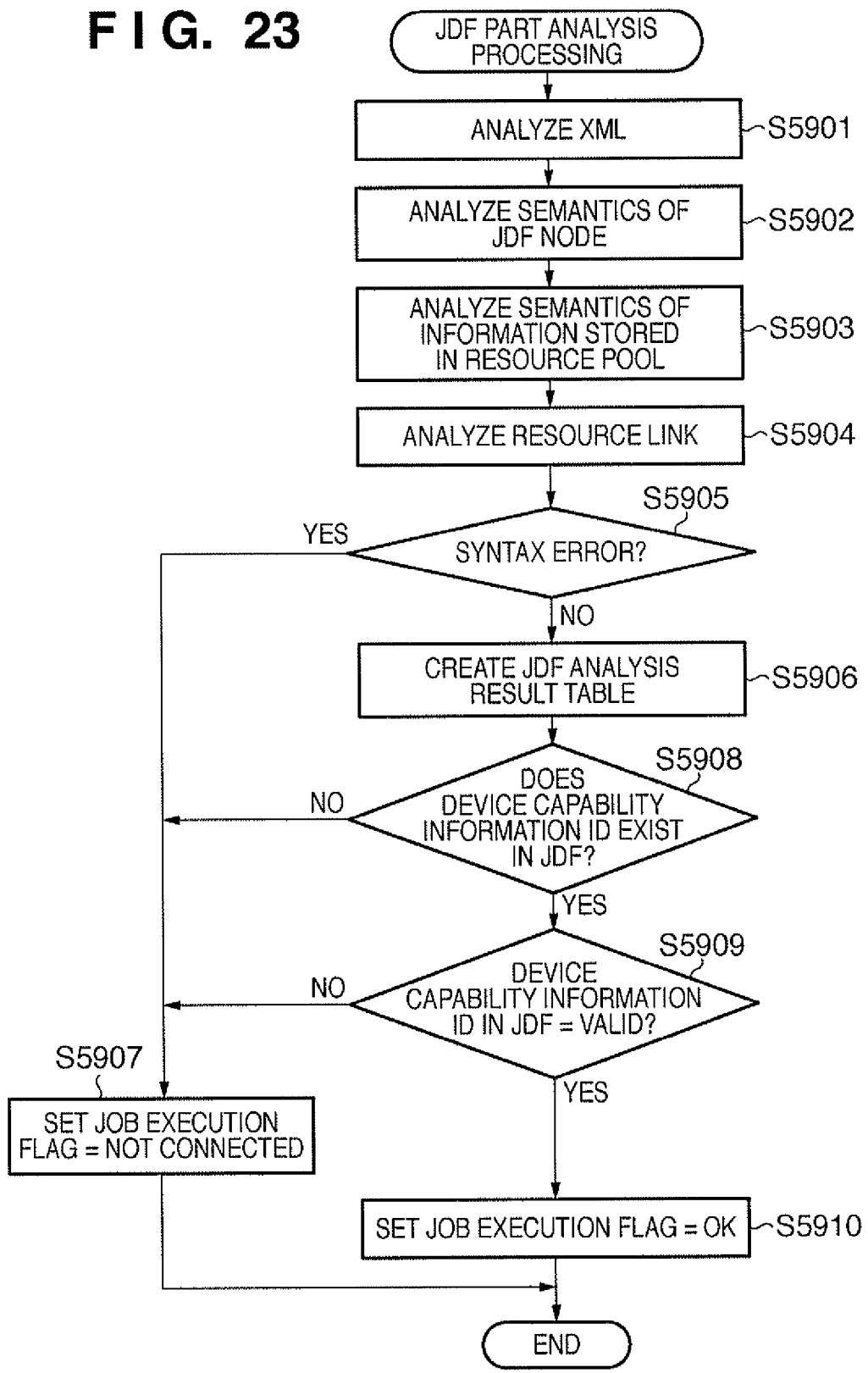
FIG. 23 is a flowchart for explaining the detailed operation of JDF part analysis processing in step S5103 shown in FIG. 19 in the second embodiment.

FIG. 23 is a flowchart showing an alternative sequence of the JDF part analysis processing shown in FIG. 20. FIG. 23 is a flowchart for explaining details of the operation in step S5103 of FIG. 19, that is, JDF part analysis processing. First, a controller 205 analyzes the XML syntax, and loads elements and attribute information described in the JDF into an internal data structure (step S5901).

Then, in step S5902 and subsequent steps, the controller 205 executes semantic analysis processing based on information obtained as a result of the analysis in step S5901. In step S5902, the controller 205 performs semantic analysis processing for a JDF node serving as a root node in the JDF. The JDF node stores information necessary for job management and information on the definition of a target process in the JDF and the like.

In step S5903, the controller 205 performs semantic analysis processing for information in a resource pool serving as the storage location of a setting parameter for job execution in the JDF. The resource pool stores various kinds of setting information which should be reflected in actual PDL rasterization processing, image processing (e.g., imposition), print processing, finishing processing, and the like.

In step S5904, the controller 205 checks whether link information between JDF processes and resources is represented properly and whether there is any inconsistent link setting (resource link analysis). Steps S5901 to S5904 correspond to the syntax analysis and semantic analysis processing of the JDF part.

After the end of the processing in step S5904, the controller 205 determines in step S5905 whether a syntax error (to be also referred to as an "analysis error") has occurred in the processes of steps S5901 to S5904. If the controller 205 determines that an analysis error has occurred (YES in step S5905), no job can be executed. Thus, the process advances to step S5907 to set a job execution flag to "not connected". The job execution flag means data set in a specific area allocated in a RAM 208 in order to execute a program for performing the processing described in the flowchart of FIG. 23 by the controller 205.

If the controller 205 determines in step S5905 that no analysis error has occurred in the processes of steps S5901 to S5904 (NO in step S5905), the process advances to step S5906 to create a JDF analysis result table. Details of the JDF analysis result table created in this step have already been described with reference to FIG. 16, and a description thereof will not be repeated. Upon completion of the processing in step S5906, the process advances to step S5908.

In step S5908, the controller 205 searches for a device capability information ID as identification information for specifying device capability information, and determines whether the device capability information ID exists in association with the JDF. If the JDF contains the device capability information ID (YES in step S5908), the process advances to step S5909. If the controller 205 determines in step S5908 that the JDF does not contain the device capability information ID (NO in step S5908), the process advances to step S5907 to set the job execution flag to "not connected" in order to stop execution of the job.

In step S5909, the controller 205 determines whether the device capability information ID contained in the JDF is valid (first determination step). This determination is made depending on whether the device capability information ID contained in the JDF matches a valid device capability information ID stored in device management information 3301. From this determination result, the controller 205 can determine whether the JDF has been created based on the latest device capability information. If the device capability information ID matches the valid device capability information ID stored in the device management information 3301 (YES in step S5909), the process advances to step S5910 to set the job execution flag to OK. If the device capability information ID does not match the valid device capability information ID stored in the device management information 3301 (NO in step S5909), the process advances to step S5907 to set the job execution flag to not connected in order to stop execution of the job.

<<Third Embodiment>>

The third embodiment is an embodiment of a client computer 104 according to the present invention. The same reference numerals as those in the first and second embodiments denote the same parts, and a difference will be described mainly.

[Hardware Configuration of Client Computer 104]

Figure 24:
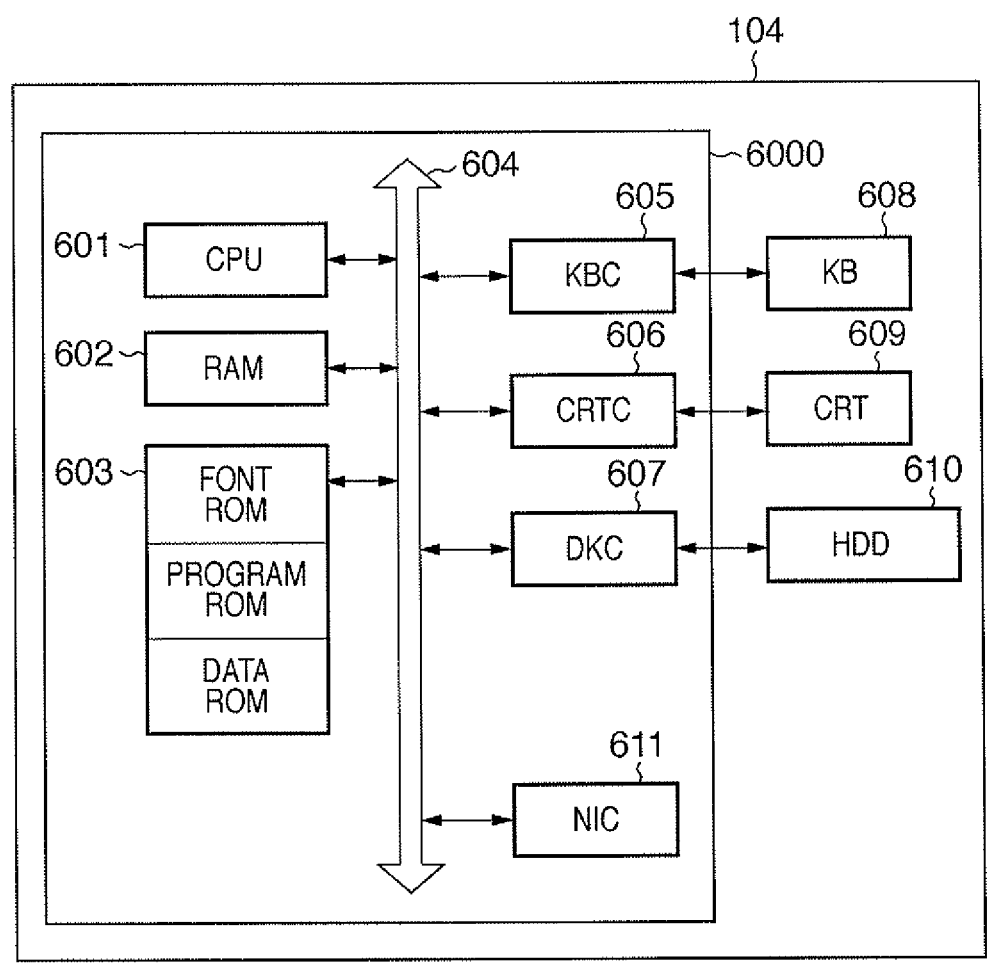
FIG. 24 is a block diagram for explaining an example of the hardware configuration of a client computer 104 to be controlled in the third embodiment.

FIG. 24 is a block diagram of the hardware of the client computer 104. A CPU 601 executes an OS, general applications, and programs such as a bookbinding application, which are stored in the program ROM of a ROM 603 or loaded from a hard disk (HDD) 610 into a RAM 602. The CPU 601 implements a software configuration in FIG. 25 or the sequence of a flowchart to be described later with reference to FIG. 26. The RAM 602 functions as a main memory, work area, etc. for the CPU 601. A keyboard controller (KBC) 605 controls key inputs from a keyboard (KB) 608 and a pointing device (not shown). A CRT controller (CRTC) 606 controls display of a CRT display 609. A disk controller (DKC) 607 controls accesses to the hard disk 610, a flexible disk (FD), or the like, which stores a boot program, various applications, font data, user files, edit files (to be described later), and the like. An NIC 611 is connected to a network and executes communication control processing with other devices connected to the network.

[Software Configuration of Client Computer 104]

Figure 25:
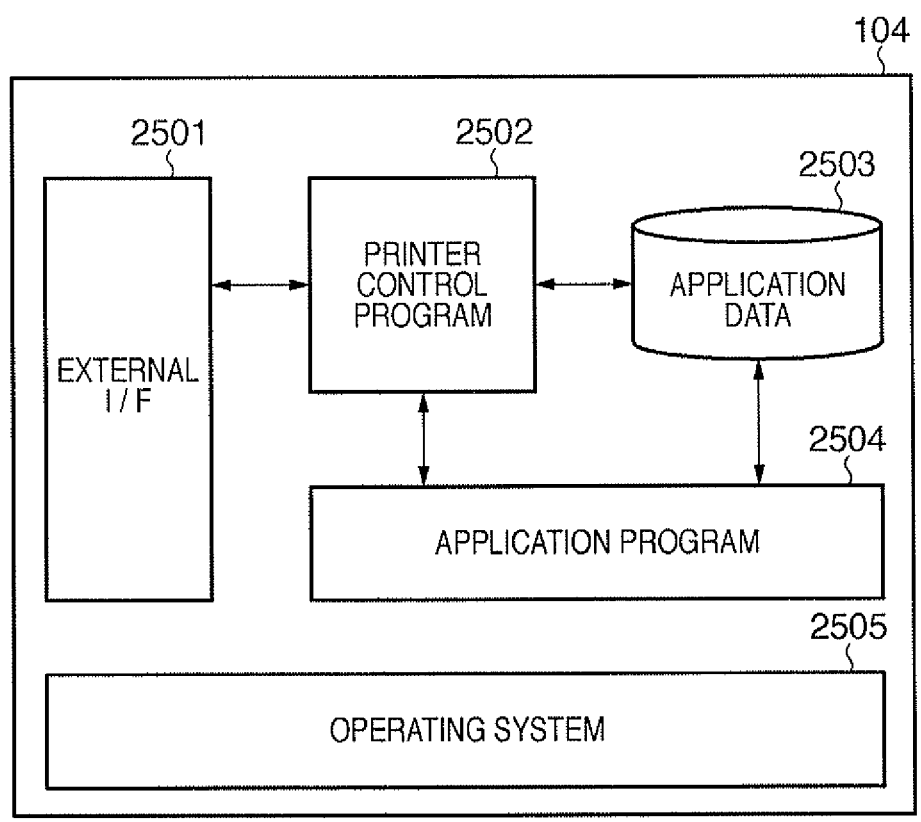
FIG. 25 is a block diagram for explaining an example of the software configuration of the client computer 104 to be controlled in the third embodiment.

FIG. 25 exemplifies a printing system applied to the present invention. The client computer 104 designates printing. An operating system 2505 runs on the client computer 104. The operating system 2505 controls hardware and software, and stores software interfacing exchange between hardware and software in a computer and data used by software. An application program 2504 loads application data 2503 to provide an application service the user wants that is recorded in the application data 2503. A printer control program 2502 generates print data suited to a printing system 1000 when the application program 2504 running on the client computer 104 instructs the printing system 1000 to print. The print data generated by the printer control program 2502 is transmitted from an external interface 2501 of the client computer 104 to the printing system 1000 via a network 101.

[Operation under Control of Printer Control Program 2502]
(Job Data Transmission Processing)

The operation of the client computer 104 under the control of the printer control program 2502 will be explained with reference to FIG. 26. FIG. 26 is a flowchart for explaining the processing sequence of job data transmission processing suitable for the printing system 1000 when the application program 2504 instructs the printing system 1000 to print.

Upon receiving a PDL file from the application program 2504, the printer control program 2502 issues a device capability information notification request. More specifically, the printer control program 2502 transmits a device capability information notification request shown in FIGS. 10 to the printing system 1000 via the external I/F 2501 (step S6101). The printing system 1000 receives the device capability information notification request, and transmits device capability information to the client computer 104 by device capability notification processing described in the first embodiment. After the device capability information notification request, the printer control program 2502 advances to step S6102 to shift to a device capability information reception standby state. The device capability information reception standby state ends in response to a factor such as reception of device capability information from the printing system 1000, disconnection of the network, or a time-out.

After the device capability information reception standby state in step S6102 ends, the process advances to step S6103 to determine whether the client computer 104 has received the device capability information from the printing system 1000. If it is determined that the client computer 104 has received the device capability information (YES in step S6103), the process advances to step S6104 to analyze the device capability information. If it is determined that the client computer 104 has not received the device capability information (NO in step S6103), the process advances to step S6105 to perform job cancellation processing. In this case, no JDF job data is transmitted to the printing system 1000 and no print processing is done.

After the end of the device capability information analysis processing in step S6104, it is determined in step S6106 whether a syntax error (analysis error) has occurred. If it is determined that an analysis error has occurred (YES in step S6106), no job can be executed. Thus, the process advances to step S6105 to perform job cancellation processing. If it is determined in step S6106 that no analysis error has occurred (NO in step S6106), the process advances to step S6107.

In step S6107, the printer control program 2502 creates a JDF. In most cases, the JDF is created based on an instruction from the application program 2504. Upon completion of the processing in step S6107, the process advances to step S6108.

In step S6108, the printer control program 2502 creates a JMF. In most cases, the JMF is created based on an instruction from the application program 2504. Upon completion of the processing in step S6108, the process advances to step S6109.

In step S6109, the printer control program 2502 conducts a device capability information test for the JDF created in step S6107. More specifically, based on the device capability information received in step S6103, the printer control program 2502 determines whether the printing system 1000 can process the JDF created in step S6107. Upon completion of the determination processing in step S6109, the process advances to step S6110.

In step S6110, the printer control program 2502 determines whether the JDF generated in step S6107 has passed the device capability information test in step S6109.

If the printer control program 2502 determines that the JDF generated in step S6107 has passed the device capability information test in step S6109 (YES in step S6110), the process advances to step S6111. If the printer control program 2502 determines that the JDF generated in step S6107 has not passed (has failed) the device capability information test in step S6109 (NO in step S6110), the process advances to step S6105 to perform job cancellation processing.

In step S6111, the printer control program 2502 determines whether a device capability information ID exists in the device capability information received in step S6103. If the printer control program 2502 determines that a device capability information ID exists in the device capability information (YES in step S6111), the process advances to step S6112 to store the device capability information ID in the JDF. Thereafter, the process advances to step S6113. If the printer control program 2502 determines that no device capability information ID exists in the device capability information (NO in step S6111), the process advances directly to step S6113 without the storage step S6112.

In step S6113, the printer control program 2502 packages the JDF, JMF, and PDL into MIME, generating job data shown in FIG. 8. The JDF and JMF are ones created in steps S6107 and S6108. The PDL is one received from the application program 2504. Upon completion of the processing in step S6113, the process advances to step S6114.

In step S6114, the printer control program 2502 transmits job data to the printing system 1000 via the external I/F 2501. Upon receiving the job data, the printing system 1000 executes print processing of a JDF print job by JDF print job print processing described in the first or second embodiment. Upon completion of the processing in step S6114, the sequence of FIG. 26 ends.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

The present invention is not limited to the above-described embodiments, and various modifications (including organic combinations of the embodiments) can be made without departing from the scope of the invention and are not excluded from the scope of the invention. For example, in the embodiments, the controller 205 in the printing apparatus serves as a main controller for various control operations. Instead, for example, an external controller in a housing different from the printing apparatus may execute some or all of the control operations.

The present invention incorporates a configuration including all configurations individually described in the embodiments and a configuration including the configuration of at least one embodiment unless the configurations are incompatible.

Various examples and embodiments of the present invention have been described. However, the scope of the invention is not limited to an exemplary description in the specification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-287946, filed Nov. 10, 2008, which is hereby incorporated by reference herein in its entirety.

What is claimed is:

1. A printing system including a printing apparatus configured to perform print processing based on a print job, the system comprising:
 a storage unit adapted to store identification information representing valid device capability information;
 a reception unit adapted to receive input of the print job;
 a specifying unit adapted to specify device capability information which is associated with the print job and which represents a function processible by the printing system by analyzing the print job received by said reception unit;
 a first determination unit adapted to determine whether the device capability information specified by said specifying unit is valid in the printing system; and
 a control unit adapted to control execution of the print job in accordance with a determination result of said first determination unit,
 wherein said specifying unit is configured to specify the device capability information by searching for identification information representing device capability information contained in the print job, and
 said first determination unit is configured to determine, depending on whether the identification information representing device capability information matches the identification information representing valid device capability information stored in said storage unit, whether the device capability information is valid in the printing system.

2. The system according to claim 1, wherein, when identification information representing the device capability information specified by the specifying unit matches identification information representing valid device capability information, said first determination unit is configured to determine that the device capability information is valid, and said control unit is configured to control the printing apparatus to process the print job in accordance with a determination result of said first determination unit.

3. The system according to claim 1, wherein, when identification information representing the device capability information does not match identification information representing valid device capability information, said first determination unit is configured to determine that the device capability information is invalid, and said control unit is configured to cancel print processing based on the print job in accordance with a determination result of said first determination unit.

4. The system according to claim 1, wherein, when said specifying unit cannot specify the device capability information, said control unit is configured to cancel print processing based on the print job.

5. The system according to claim 1, further comprising a second determination unit adapted to determine whether the printing system can execute the print job by collating an analysis result of processing necessary for the print job, the analysis result being supplied by said specifying unit and information of a device included in the printing system.

6. The system according to claim 5, wherein,
when said specifying unit cannot specify the device capability information, said second determination unit is configured to determine whether the printing system can execute the print job, and
when said second determination unit determines that the printing system can execute the print job, said control unit is configured to control the printing apparatus to perform print processing based on the print job, and
when said second determination unit determines that the printing system cannot execute the print job, said control unit cancels the print processing based on the print job.

7. The system according to claim 5, wherein,
when said first determination unit determines that the device capability information is invalid in the printing system, said second determination unit is configured to determine whether the printing system can execute the print job, and
when said second determination unit determines that the printing system can execute the print job, said control unit is configured to controls the printing apparatus to perform print processing based on the print job, and
when said second determination unit determines that the printing system cannot execute the print job, said control unit is configured to cancel the print processing based on the print job.

8. The system according to claim 1, further comprising:
a generation unit adapted to generate the device capability information by acquiring information on a device connected to the printing system; and
an addition unit adapted to generate identification information representing the device capability information and to add the identification information to the device capability information,
wherein the identification information added to the device capability information is stored in said storage unit as the identification information representing valid device capability information.

9. The system according to claim 8, further comprising a third determination unit adapted to determine whether the function processable by the printing system has changed,
wherein, when said third determination unit determines that the function processable by the printing system has changed, said generation unit is configured to generate device capability information corresponding to the change of the function,
said addition unit is configured to generate identification information representing the generated device capability information and to add the generated identification information to the generated device capability information, and
the generated identification information is stored in said storage unit as the identification information representing valid device capability information.

10. The system according to claim 9, wherein said third determination unit is configured to detect, as a change of the function processable by the printing system, at least one of a change of a device configuration, a change of an available print medium, a change of a remaining amount of consumables, and a change of a device operation state.

11. The system according to claim 8, further comprising a transmission unit adapted to transmit the device capability information generated by said generation unit to an information processing apparatus via a network.

12. The system according to claim 1, wherein the print job contains JDF data.

13. The system according to claim 1, wherein the device capability information is JMF data.

14. A print job processing method in a printing system including a printing apparatus which performs print processing based on a print job, the method comprising:
a storage step of storing, in a storage unit, identification information representing valid device capability information;
an accepting step of accepting input of the print job;
a specifying step of specifying device capability information which is associated with the print job and represents a function processable by the printing system, by analyzing the print job accepted in the accepting step;
a first determination step of determining whether the device capability information specified in the specifying step is valid in the printing system; and
a control step of controlling execution of the print job in accordance with a determination result of the first determination step,
wherein in the specifying step, the device capability information is specified by searching for identification information representing device capability information contained in the print job, and
in the first determination step, whether the device capability information is valid in the printing system is determined depending on whether the identification information representing device capability information matches the identification information representing valid device capability information stored in the storage unit.

15. The method according to claim 14, wherein when identification information representing the device capability information matches identification information representing valid device capability information, the device capability information is determined in the first determination step to be valid, and the printing apparatus is controlled in the control step to process the print job in accordance with a determination result of the first determination step.

16. The method according to claim 14, wherein when the identification information representing device capability information does not match the identification information representing valid device capability information, the device capability information is determined in the first determination step to be invalid, and print processing based on the print job is cancelled in the control step in accordance with a determination result of the first determination step.

17. The method according to claim 14, wherein when the device capability information is not specified in the specifying step, print processing based on the print job is cancelled in the control step.

18. The method according to claim 14, further comprising a second determination step of determining whether the printing system can execute the print job, by collating an analysis result of processing necessary for the print job analyzed in the specifying step and information of a device included in the printing system.

19. The method according to claim 18, wherein,
when the device capability information is not specified in the specifying step, whether the printing system can execute the print job is determined in the second determination step, and
when the printing system is determined in the second determination step to be able to execute the print job, the printing apparatus is controlled in the control step to perform print processing based on the print job, and when the printing system is determined not to be able to execute the print job, print processing based on the print job is cancelled in the control step.

20. The method according to claim 18, wherein,
when the device capability information is determined in the first determination step to be invalid in the printing system, whether the printing system can execute the print job is determined in the second determination step, and
when the printing system is determined in the second determination step to be able to execute the print job, the printing apparatus is controlled in the control step to perform print processing based on the print job, and when the printing system is determined not to be able to execute the print job, the print processing based on the print job is cancelled in the control step.

21. The method according to claim 14, further comprising:
a generation step of generating the device capability information by acquiring information on a device connected to the printing system; and
an addition step of generating identification information representing the device capability information and adding the identification information to the device capability information,
wherein the identification information added to the device capability information is stored in the storage unit as the identification information representing valid device capability information.

22. The method according to claim 21, further comprising a third determination step of determining whether the function processible by the printing system has changed,
wherein when the function processible by the printing system is determined in the third determination step to have changed, device capability information corresponding to the change of the function is generated in the generation step,
in the addition step, identification information representing the generated device capability information is generated to add the generated identification information to the generated device capability information, and
the generated identification information is stored in the storage unit as the identification information representing valid device capability information.

23. The method according to claim 22, wherein in the third determination step, at least one of a change of a device configuration, a change of an available print medium, a change of a remaining amount of consumables, and a change of a device operation state is detected as a change of the function processible by the printing system.

24. The method according to claim 21, further comprising a transmission step of transmitting the device capability information generated in the generation step to an information processing apparatus via a network.

25. The method according to claim 14, wherein the print job contains JDF data.

26. The method according to claim 14, wherein the device capability information is JMF data.

27. A non-transitory computer-readable storage medium storing a program configured to cause a computer running the program to carry out a method in a printing system including a printing apparatus which performs print processing based on a print job, the method comprising:
a storage step of storing, in a storage unit, identification information representing valid device capability information;
an accepting step of accepting input of the print job;
a specifying step of specifying device capability information which is associated with the print job and represents a function processible by the printing system, by analyzing the print job accepted in the accepting step;
a first determination step of determining whether the device capability information specified in the specifying step is valid in the printing system; and
a control step of controlling execution of the print job in accordance with a determination result of the first determination step,
wherein in the specifying step, the device capability information is specified by searching for identification information representing device capability information contained in the print job, and
in the first determination step, whether the device capability information is valid in the printing system is determined depending on whether the identification information representing device capability information matches the identification information representing valid device capability information stored in the storage unit.

* * * * *